(12) United States Patent
Gan et al.

(10) Patent No.: US 11,447,400 B2
(45) Date of Patent: Sep. 20, 2022

(54) SYSTEM AND METHOD FOR SOLAR VAPOR EVAPORATION AND CONDENSATION

(71) Applicant: The Research Foundation for The State University of New York, Amherst, NY (US)

(72) Inventors: Qiaoqiang Gan, East Amherst, NY (US); Zongfu Yu, Madison, WI (US); Zhejun Liu, Williamsville, NY (US); Haomin Song, Williamsville, NY (US); Matthew Singer, Morristown, NJ (US); Chenyu Li, Mianyang (CN)

(73) Assignee: The Research Foundation for The State University of New York, Amherst, NY (US)

( * ) Notice: Subject to any disclaimer, the term of this patent is extended or adjusted under 35 U.S.C. 154(b) by 224 days.

(21) Appl. No.: 16/464,979

(22) PCT Filed: Nov. 30, 2017

(86) PCT No.: PCT/US2017/063993
§ 371 (c)(1),
(2) Date: May 29, 2019

(87) PCT Pub. No.: WO2018/102573
PCT Pub. Date: Jun. 7, 2018

(65) Prior Publication Data
US 2019/0322543 A1    Oct. 24, 2019

Related U.S. Application Data

(60) Provisional application No. 62/517,604, filed on Jun. 9, 2017, provisional application No. 62/428,138, filed on Nov. 30, 2016.

(51) Int. Cl.
*C02F 1/14* (2006.01)
*B01D 1/00* (2006.01)
(Continued)

(52) U.S. Cl.
CPC .............. *C02F 1/14* (2013.01); *B01D 1/0005* (2013.01); *B01D 1/0035* (2013.01); *B01D 5/006* (2013.01);
(Continued)

(58) Field of Classification Search
CPC .. C02F 1/14; C02F 2103/007; C02F 2103/08; B01D 1/00; B01D 1/0005; B01D 1/0035;
(Continued)

(56) References Cited

U.S. PATENT DOCUMENTS 3,501,381 A   3/1970 Delano
3,526,583 A   9/1970 Hayward
(Continued)

FOREIGN PATENT DOCUMENTS

AU   2006/100926 A4   1/2007
CN      102674490 A    9/2012
(Continued)

*Primary Examiner* — Brian A McCaig
(74) *Attorney, Agent, or Firm* — Hodgson Russ LLP

(57) ABSTRACT

A solar vapor generator system and method are provided. In some embodiments, the system has near perfect energy conversion efficiency in the process of solar vapor generation below room temperature. Remarkably, when the operation temperature of the system is below that of the surroundings, the total vapor generation will be higher than the upper limit that can be produced by the input solar energy.

24 Claims, 26 Drawing Sheets

(51) Int. Cl.
*B01D 5/00* (2006.01)
*C02F 103/00* (2006.01)
*C02F 103/08* (2006.01)

(52) U.S. Cl.
CPC .... *C02F 2103/007* (2013.01); *C02F 2103/08* (2013.01)

(58) Field of Classification Search
CPC .... B01D 1/0082; B01D 5/006; Y02A 20/124; Y02A 20/142; Y02A 20/212; Y02W 10/37
See application file for complete search history.

(56) References Cited

U.S. PATENT DOCUMENTS

| | | | |
|---|---|---|---|
| 4,613,409 A * | 9/1986 | Volland | B01D 1/04 203/10 |
| 9,459,024 B2 | 10/2016 | Ghasemi et al. | |
| 2014/0027284 A1 * | 1/2014 | McKee | G01N 27/44747 204/466 |
| 2015/0072133 A1 * | 3/2015 | Ghasemi | B32B 5/32 428/312.6 |
| 2015/0353385 A1 | 12/2015 | Wang et al. | |

FOREIGN PATENT DOCUMENTS

| | | |
|---|---|---|
| CN | 104032572 A | 9/2014 |
| JP | S60188756 A | 9/1985 |
| WO | 00/03779 A1 | 1/2000 |
| WO | 2012/087935 A2 | 6/2012 |

* cited by examiner

 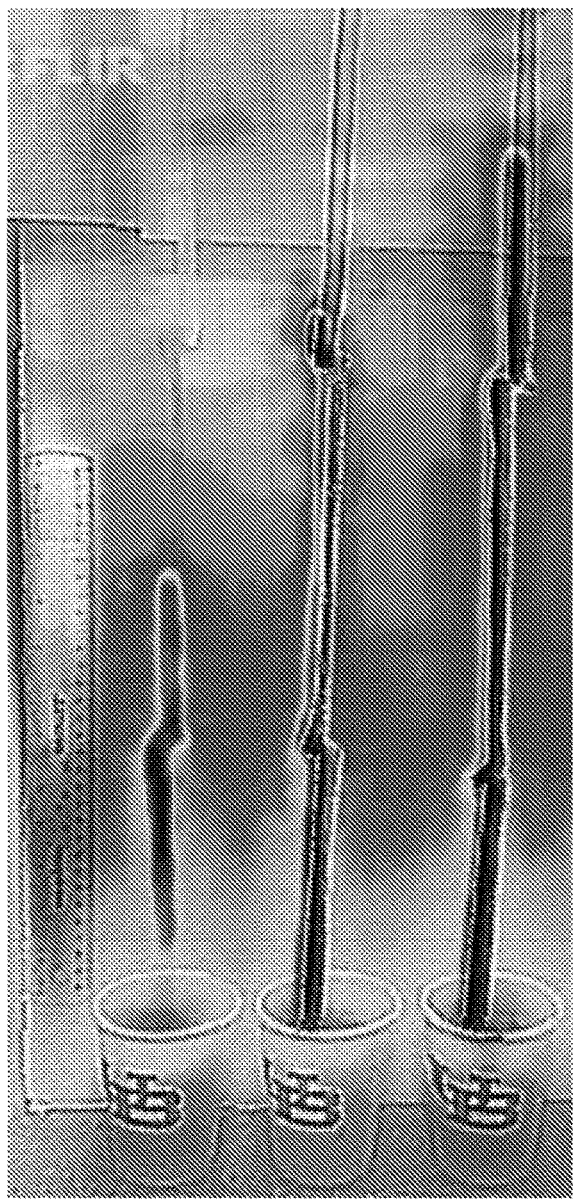
Fig. 5A                    Fig. 5B

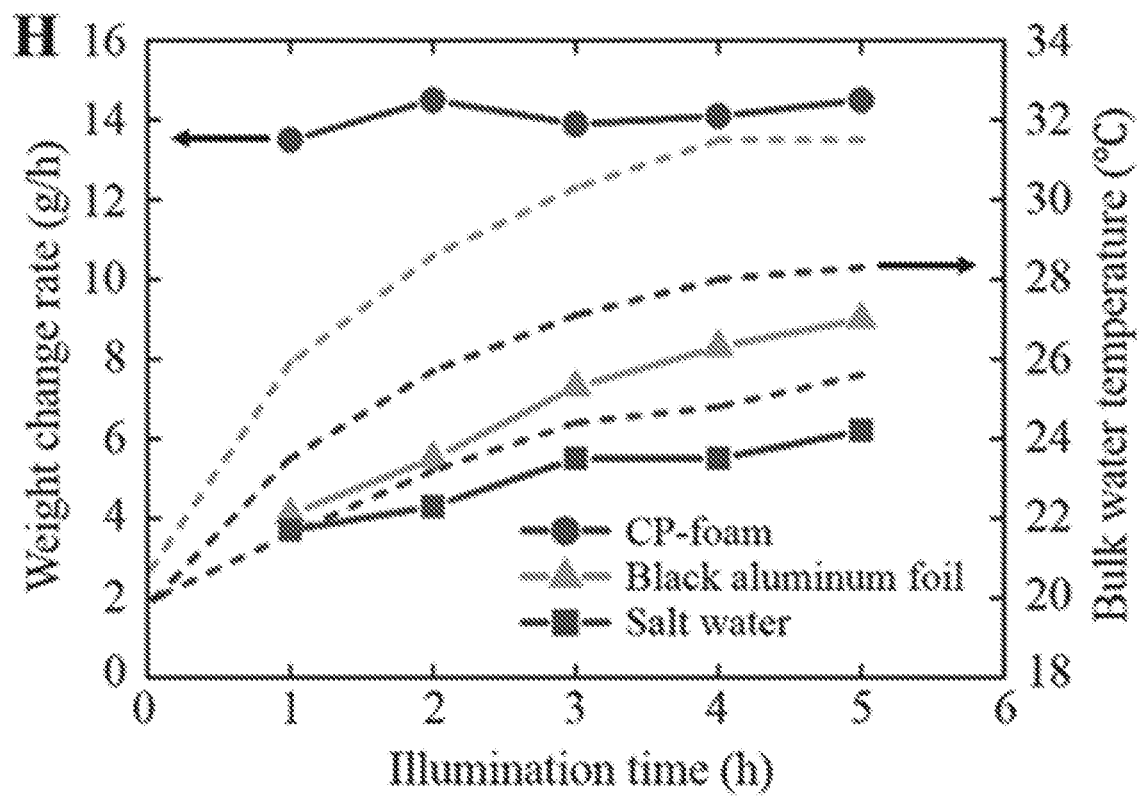
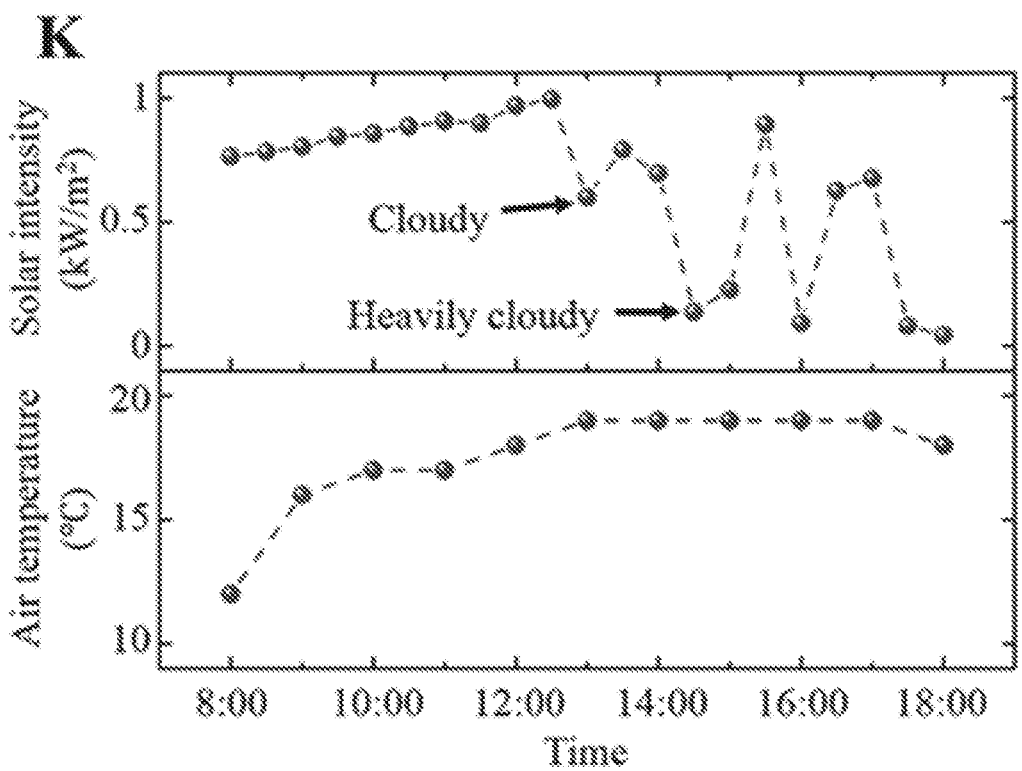
Fig. 19B

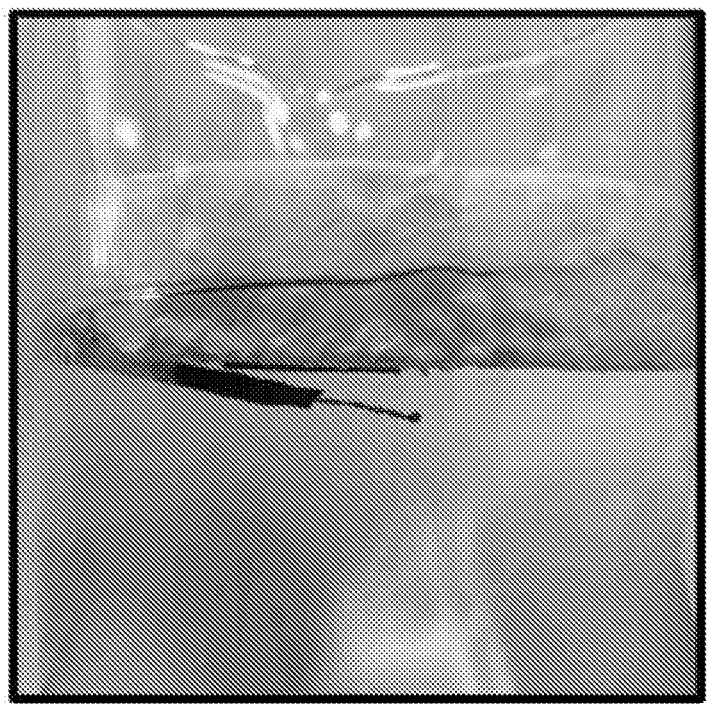
Fig. 22

SYSTEM AND METHOD FOR SOLAR VAPOR EVAPORATION AND CONDENSATION

CROSS-REFERENCE TO RELATED APPLICATIONS

This application claims priority to U.S. Provisional Application No. 62/428,138, filed on Nov. 30, 2016, and U.S. Provisional Application No. 62/517,604, filed on Jun. 9, 2017, the disclosures of which are incorporated herein by reference.

BACKGROUND OF THE DISCLOSURE

The advent of the steam engine was one of the key developments that led to the first Industrial Revolution. Since then, the use of steam has influenced many aspects of modern life. For instance, thermal steam generation and condensation was one of the dominant technologies for seawater desalination before the introduction of reverse osmosis technologies. Although membrane-based technologies became the dominant solution to desalination, they are usually energetically demanding with serious environmental impacts arising from cleaning and maintenance. As a result, there is emerging global interest in developing alternative desalination technologies to address these issues. Solar vapor generation with no electrical input is proving to be a promising and environmentally benign solution, especially in resource limited areas. However, conventional techniques for generating solar vapor typically rely on costly and cumbersome optical concentration systems to enable bulk heating of a liquid, resulting in relatively low efficiencies (e.g., 30%-40%) due to heat absorption throughout the entire liquid volume that is not directly translated into vapor production. Recently, various advanced and expensive metallic plasmonic and carbon-based nanomaterials have been explored for use in solar vapor/steam generation. However, the vaporization efficiencies of these reported structures are still relatively low under 1 sun illumination (e.g., 48% (10)~83%).

For practical outdoor solar still applications, stable and continuous solar illumination is not achievable in most areas of this planet due to varying weather conditions. Even with inexpensive moderate solar concentrators, a stable incident power higher than AM 1.5 solar light still cannot be guaranteed. Additionally, since most solar stills are covered by glass or other similar collection material, condensation can lead to optical scattering and a decrease in the incident solar power. Therefore, vapor generation under <1 solar illumination condition is an important, long-felt need, despite being neglected in most previously reported work.

BRIEF SUMMARY OF THE DISCLOSURE

The present disclosure provides an alternative approach to solar vapor generation using a supported substrate. In an extremely cost-efficient and effective embodiment, the substrate is a carbon black-dyed cellulose-polyester blend (CCP) and the support is expanded polystyrene foam (EPS). A system according to some embodiments of the disclosed technology achieved a record thermal conversion efficiency of ~88% under non-concentrated solar illumination of 1 kW/m². This corresponds to an optimized vapor generation rate that is ~3 times greater than that of natural evaporation. Stable and repeated seawater desalination tests were performed in a portable prototype both in the laboratory and an outdoor environment, and achieved a water generation rate that was 2.4 times that of a commercial product. Also, desalination systems according to some embodiments of the present disclosure largely avoid the costs for seawater intake and pretreatment that are generally required for conventional reverse osmosis processes. Compared with previously reported advanced nanostructures, this CP-EPS system is extremely low-cost in terms of both materials and fabrication, environmentally benign, and safe to handle during production. These attributes enable such a system to be easily expanded to a large scale system. Furthermore, embodiments of the present system may be used for simultaneous fresh water generation and treatment from heavily contaminated source water. Membrane filters and photocatalysts may also be incorporated to purify contaminated source water. Considering the challenges in contaminated/waste water treatment and reuse, the development of low cost, electricity-free, and multi-functional technologies represents a significant advance in the field.

In some embodiments, the approach further utilizes cold vapor below room temperature, and provides a near unity conversion efficiency of absorbed solar energy. Due to the energy contribution from the surroundings, the measured total vapor generation is higher than the upper limit that can be produced by a given incident solar energy. Importantly, this breakthrough technique was realized using the extremely low cost CCP-foam system under 1 sun illumination, with no need for advanced and expensive nanomaterials. In addition, features for optically absorbing and evaporative materials for solar still systems are shown: i.e., under a given environment, a stronger natural evaporation capability will result in a lower surface temperature. This provides applications in solar still technology, evaporative cooling and solar evaporated mining applications, evaporation-driven generators and recently reported water-evaporation-induced electricity.

DESCRIPTION OF THE DRAWINGS

For a fuller understanding of the nature and objects of the disclosure, reference should be made to the following detailed description taken in conjunction with the accompanying drawings, in which:

FIG. 5A shows the configuration of a water diffusion height experiment for three sample substrates: white substrate (left); CCP (center); sodium alginate treated CCP (right).

FIG. 5B is a thermal image of the three sample substrates of FIG. 5A showing the resulting water diffusion heights.

FIG. 19B (H) Hourly water weight change with the exemplary CCP-foam array on the water surface (dots), black aluminum foil at the bottom (triangles), and salt water (squares) as a function of illumination time; the top dashed line is the hourly bulk water temperature under CCP foam; middle dashed line is the hourly bulk water temperature with the black aluminum foil at the bottom of the container; bottom dashed line is the hourly water weight change of salt water. (K) The solar intensity (upper panel) and outdoor temperature curves (lower panel) from 8:00 am to 6:00 pm on May 6, 2016.

FIG. 22 Photographs of an experimental setup to measure the temperature of (A) vapor and (B) bulk water.

DETAILED DESCRIPTION OF THE DISCLOSURE

Figure 1:
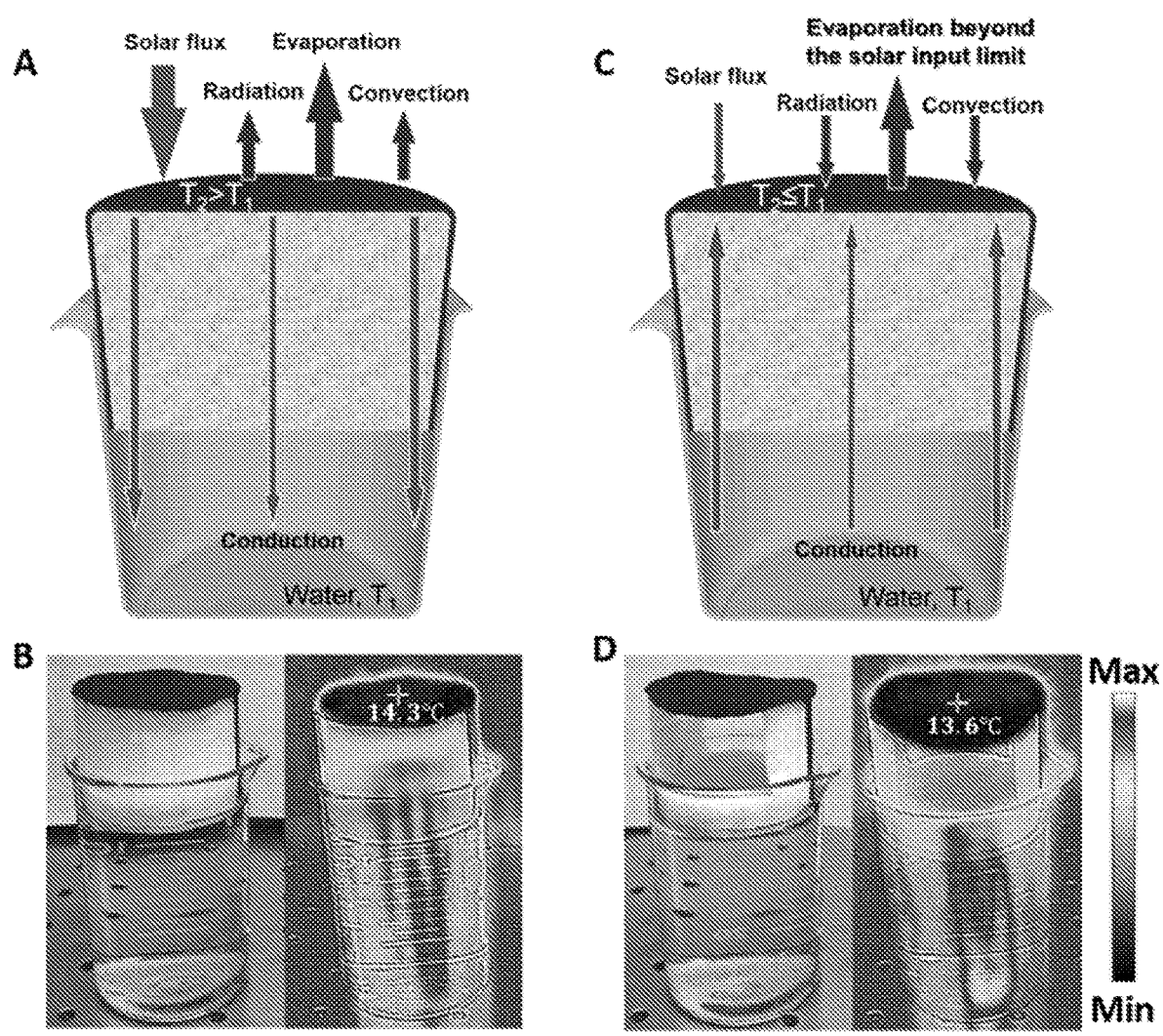
FIG. 1 depicts the physical mechanism of vapor generation. (A) Energy balance and heat transfer diagram of the CCP-foam under strong solar illumination. The surface temperature, $T_2$, is higher than the room (ambient) temperature, $T_1$. (B) A photograph of CCP-foam floating on top of water surface and its corresponding thermal image under dark environment—the surface temperature is below room temperature. (C) Energy balance and heat transfer diagram of the CCP-foam under dark environment or low intensity illumination. (D) A photograph of a CCP-air gap-foam structure floating on top of water and its corresponding thermal image under dark environment—the surface temperature is even lower than the CCP-foam structure.

Unless defined otherwise herein, all technical and scientific terms used in this disclosure have the same meaning as commonly understood by one of ordinary skill in the art to which this disclosure pertains. The disclosure includes all combinations of all components and steps described herein. Throughout this application, the singular form includes the plural form and vice versa.

By utilizing extremely low-cost materials in this invention, economically viable large-area systems are now possible with no energy input required for operation. This prospect is particularly attractive for addressing global freshwater shortages, especially for individuals to purify water for personal needs (i.e., ~2 liter/day) in developing regions. Because embodiments of the present disclosure do require special micro/nanofabrication processes and do not require solar concentrators, the disclosed technology is extremely low-cost and amenable to scaling up over large or huge areas for real applications.

Without being bound by any theory, due to the superior absorption, heat conversion, and insulating properties of the presently-disclosed CCP-foam structure, most of the absorbed energy can be used to evaporate surface water with significantly reduced thermal dissipation compared with previously reported architectures. Without being bound by any theory, due to the thermal insulation between the surface liquid and the bulk volume of the water and the suppressed radiative and convective losses from the absorber surface to the adjacent heated vapor, a record solar thermal conversion efficiency of >88% under illumination of 1 kW/m$^2$ (corresponding to the evaporation rate of 1.28 kg/(m$^2$·h)) was realized using an embodiment of the disclosure having no solar concentration. When scaled up to a 100 cm$^2$ array in a portable solar water still system, the outdoor fresh water generation rate was 2.4 times of that of a leading commercial product. Furthermore, seawater desalination was also demonstrated with reusable stable performance.

To enhance the vapor generation rate, typically the approach is to increase the operation temperature for a given solar illumination. However, this will inevitably increase the thermal loss to the surroundings mainly via conduction, convection and radiation losses. Therefore, high temperature solar vapor generation (e.g., with solar concentration) inherently suffers from limits in energy conversion efficiencies.

In some embodiments, present disclosure provides techniques which take an opposite approach, using solar energy to generate cold vapor below room temperature, to provide surprising results. This is a breakthrough pathway for efficient solar vapor generation since under illumination at low power densities, the absorbed-light-to-vapor energy conversion efficiency can reach ~100% when the evaporation temperature is lower than the room temperature. Under this condition, the environment will provide additional energy for vapor generation, resulting in a total vaporization rate that is higher than the upper limit that can be produced using the input solar energy alone. This cold vapor generation technique was experimentally validated and demonstrated limit-breaking vaporization rates using an extremely low cost CCP-foam system.

Figure 13:
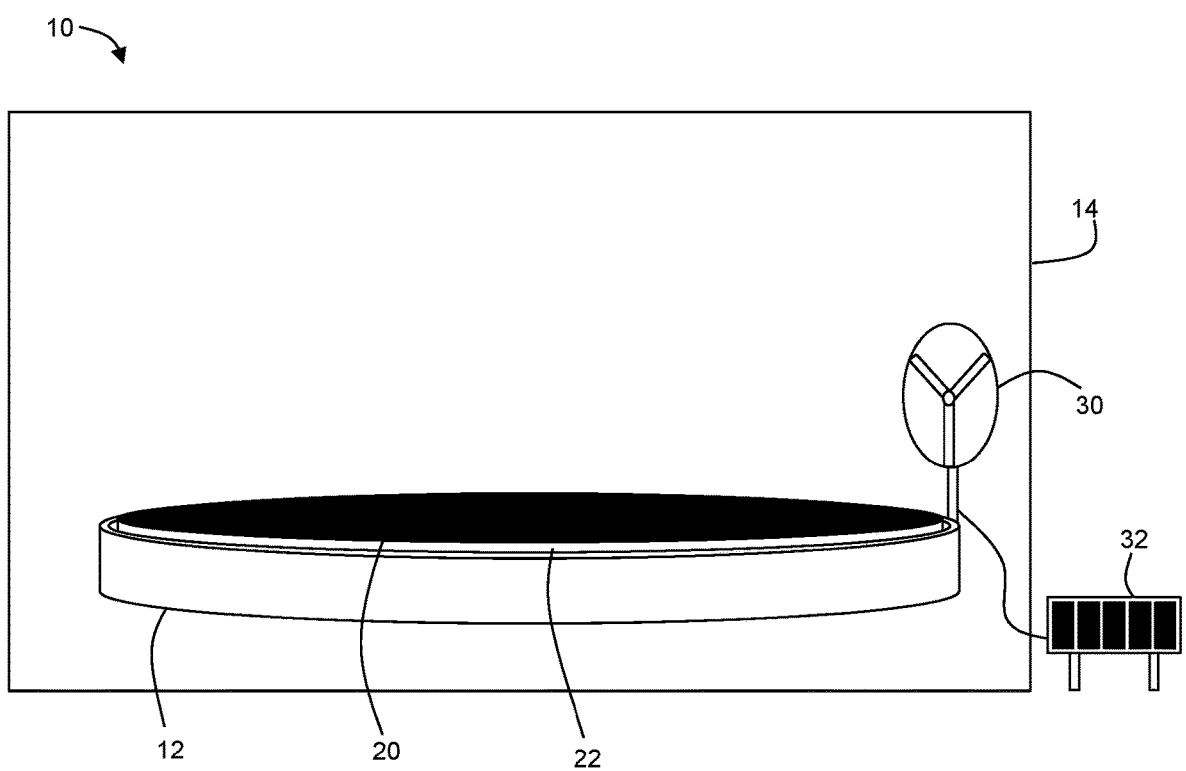
FIG. 13 depicts a system according to another embodiment of the present disclosure.

With reference to FIG. 13, in a first aspect, the present disclosure may be embodied as a solar vapor generation system 10 having an open-topped vessel 12 for holding a solution, for example, a water-based solution. A substrate 20 is configured to be placed in the open-topped vessel 20. The substrate 20 is configured to wick solution from the vessel 12. The substrate 20 may be supported near an exposed surface of the solution (i.e., near the top of the open-topped vessel 12) by a support 22. The support may have a density less than water. The support 22 may be thermally insulative and/or thermally stable. The support 22 may be a foam. The support 22 may be configured to not absorb water. The support 22 may comprise expanded polystyrene foam (EPS), polyurethane foam, polyvinyl chloride foam, polyethylene form, a phenol formaldehyde resin foam, or other foam materials or combinations of one or more materials. The support 22 may include an air gap, to separate at least a portion of the substrate 20 from the support 22 allowing air to pass between a portion of the support 22 and the substrate 20 (see, e.g., FIG. 27).

The system 10 may further comprise a housing 14. The substrate 20 and the support 22 may be located within the housing 14. In some embodiments, at least a portion of the vessel 12 may be located within the housing 14. The housing 14 may be configured so as to admit solar energy. For example, the housing 14 may have a transparent top. For example, the housing 14, or a portion thereof, may be made from a transparent plastic, a transparent glass, a transparent polymer membrane (e.g., microwave membrane), etc. In some embodiments, an interior surface of the cover is coated with a non-toxic, anti-mist super-hydrophobic surface treatment.

The system 10 may further comprise an air mover 30 configured to cause air (e.g., ambient air) to move adjacent to the substrate 20. The air mover 30 may be an electrically-powered fan 30, which may be powered by way of, for example, a solar cell 32.

In some embodiments, a temperature of the substrate 20 is maintained substantially at or below an ambient temperature. For example, in embodiments having a housing 14, the housing may be a temperature-controlled housing 14 for maintaining an ambient temperature above the temperature of the substrate 20. By maintaining a temperature substantially at an ambient temperature, it is intended that the temperature of the substrate be maintained to within 5° C. of the ambient temperature. In some embodiments, substantially at the ambient temperature means to maintain the temperature to within 1, 2, 3, or 4° C. or any other value therebetween to within a decimal position. In some embodiments, the substrate is maintained at a temperature below the ambient temperature.

In some embodiments, the system 10 is used as a solar still. For example, in such embodiments, the system 10 may be used to desalinate water for use as drinking water. In such embodiments, the system 10 may further comprise a condenser for condensing the generated vapor. For example, the housing 14 may be configured such that vapor condenses on the housing 14 (i.e., an inner surface of the housing) for recovery of the condensate. In other embodiments, a condenser, such as a condensation trap, may be located within the housing or outside of the housing.

As will be further described below under the heading "Further Discussion," the substrate 20 may be configured as a planar sheet generally parallel to a top surface of the solution. In another embodiment, the substrate is tent-shaped, comprising two planar sheets connected to one another along an adjoining edge. The two planar sheets of a tent-shaped substrate may connect at any angle, for example, at an angle of between 1.0 and 180.0 degrees, all values and ranges therebetween to the first decimal place (tenths). In some embodiments, the two planar sheets connect at an angle of between 20.0 and 45.0 degrees, inclusive and all values and ranges therebetween to the first decimal place (tenths).

The substrate may be a porous material, such as, for example, a fabric. The substrate may comprise paper and/or plastic, for example, a porous fabric material comprising paper and/or plastic. In some embodiments, the substrate is a hydroentangled, non-woven 55% cellulose/45% polyester blend, such as TechniCloth™ Wiper TX609, available from Texwipe. The word "paper" does not signify, expressly or implicitly, any equivalence between the "paper" used in some embodiments of the subject disclosure and alternative paper material including any prior substrate which may have been called "paper," but which may have a different or unknown composition or arrangement of fibers. The material may comprise material or material(s) suitable for the purposes of the present substrate as will be apparent in light of the present disclosure.

In some embodiments, the substrate comprises a cellulose/polyester blend. The blend may comprise about 35% to about 75% cellulose, including all integers and ranges therebetween, and about 45% to about 65% polyester, including all integers and ranges therebetween. In an embodiment, the blend may comprise about 55% cellulose and about 45% polyester. In another embodiment, the substrate may consist essentially of cellulose, while in a different embodiments, the substrate does not consist essentially of cellulose.

In some embodiments, the substrate is made from non-woven fibers. In other embodiments, the substrate is made from woven fibers (e.g., yarns). In other embodiments, the substrate is a composite material. For example, the substrate may be made from one or more non-woven layers and/or one or more woven layers. In another example of a composite, the substrate may be made from more than one layer, each layer made from the same or different materials. Plastic or paper filter (virgin kraft paper) may also be used as the substrate. In a further embodiment, the substrate does not consist essentially of any one of the following: coral fleece fabric, cotton, wool, nylon, jute cloth, coir mate or polystyrene sponge.

In some embodiments, the substrate has a dark hue au naturale. In some embodiments, the substrate is coated, dyed, or otherwise colored to attain a dark hue. In some embodiments, the substrate is black or substantially black. For example, the substrate may be coated, dyed, or otherwise colored with carbon black. In some embodiments, the carbon black comprises nanoporous carbon black, microporous carbon black, or a mixture thereof. In another embodiment, the carbon black consists essentially of nanoporous carbon black. Selecting carbon black of a particular sized porosity may be helpful in cleaning contaminated water. However, it is not necessary for the distillation of water, in which general purpose black carbon may be used. Other black or dark pigments may also be used to dye or coat the substrate.

In some embodiments, the substrate may have a length of about 8 cm to about 14 cm and all integers and ranges therebetween. The length was determined by the water transportation capability of the substrate. The exemplary length of about 10 cm to about 14 cm was used in an exemplary embodiment for a hydroentangled (non-woven) substrate consisting of about 55% cellulose and about 45% polyester. The width may be greater for more substrates with greater liquid transport potential. The length may be less than 10 cm or greater than 14 cm according to the application at hand.

In some embodiments, the substrate may have a width of about 8 cm to about 14 cm and all integers and ranges therebetween. The width was determined by the water transportation capability of the substrate. The exemplary width of about 8 cm to about 14 cm was used with a hydroentangled (non-woven) substrate consisting of about 55% cellulose and about 45% polyester. The width may be greater for more substrates with greater liquid transport potential. The width may be less than 8 cm or greater than 14 cm according to the application at hand.

In some embodiments, the substrate has the shape of a cross. In some embodiments, the substrate has the shape of a square or rectangle. The substrate may be any shape suitable to the application.

Figure 27:
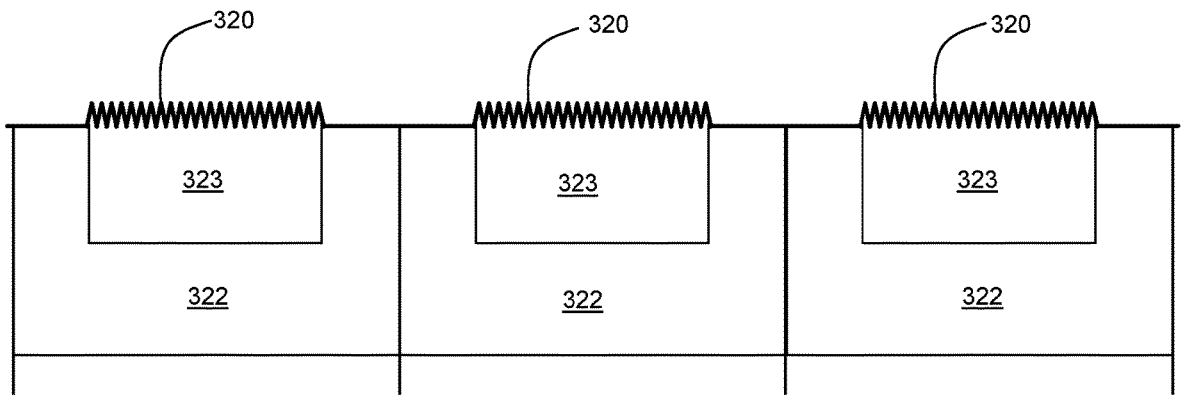
FIG. 27 is a diagram of an exemplary floating CCP-foam with air gap for thermal isolation (side view).

In some embodiments, the substrate is corrugated, in whole or in part (see, e.g., FIG. 27). For the corrugation, smaller angles with straight and sharp angle tips may be advantageous. Considering the moving sun light, using corrugation having a smaller depth may be better because using a large depth may cause a shadow effect whereby some substrate will be shielded from light. An upper limit of the corrugation depth may be selected such that the solution can be transported to the entire surface of the substrate. Corrugation not only significantly increases the surface area, but also maintains the evaporated vapor at a relatively low temperature so that energy loss to heat the water and vapor can be suppressed, without being bound by any theory.

In some embodiments, the substrate and its support float at the surface of the solution. For example, the solution may be source water to be distilled. In such embodiments, where the substrate and its support float on the source water, the dimensions of the support and of the substrate may be selected so that the ends of the substrate overlap the edges of the support and contact the source water as shown in FIG. 2A.

In some embodiments, the support has a length of about 8 to about 10 cm. In some embodiments, the support has a width of about 8 to about 10 cm. The support has a height of about 8 to about 14 cm. The height can be greater for more absorbent substrates or substrates with enhanced liquid transport (wicking) capability. As before, these dimensions were optimized for a hydroentangled (non-woven) substrate consisting of about 55% cellulose and about 45% polyester. The dimensions of the support and of the substrate may be selected so that the ends of the substrate overlap the edges of the support as shown in FIG. 2A. Other support sizes may be used and the above are merely exemplary dimensions used to illustrate the present disclosure.

Figure 24:
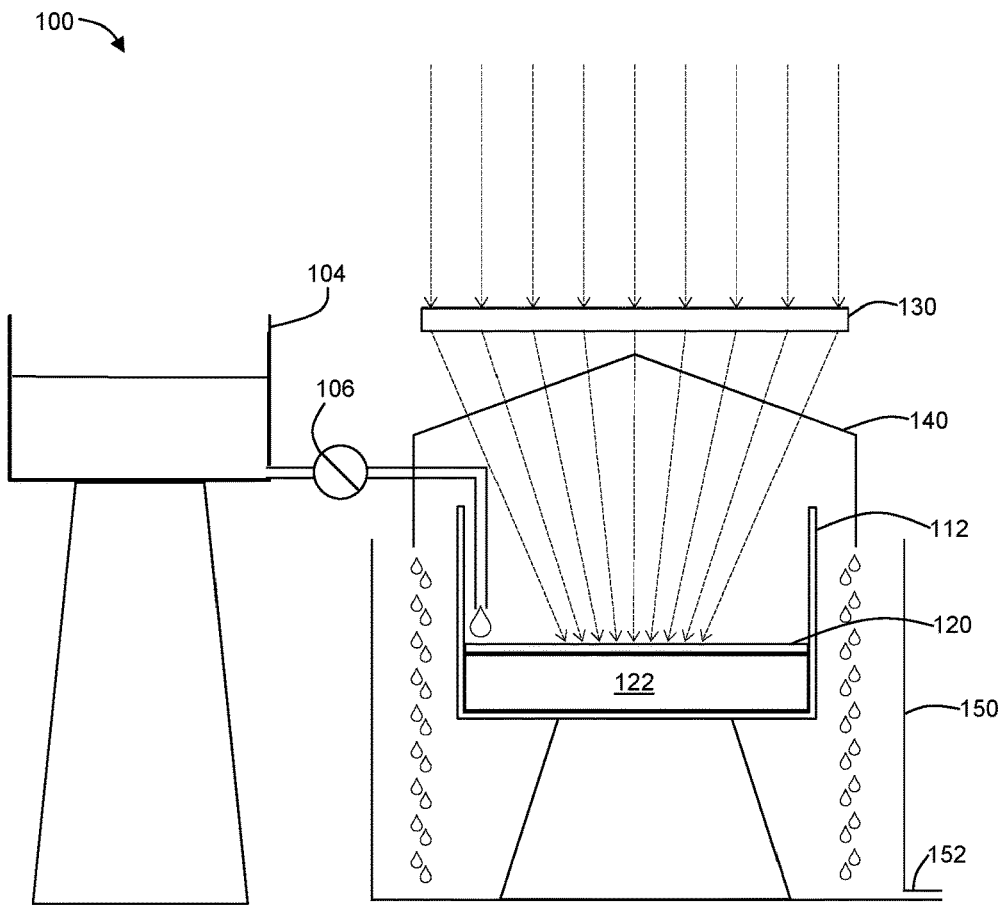
FIG. 24 is a diagram depicting another embodiment of the present disclosure.

FIG. 24 depicts a solar vapor evaporation and condensation system 100 according to another embodiment of the present disclosure. A water source 104 is configured to provide a supply of water to an open-topped vessel 112. For example, the water source 104 may be higher than the vessel 112 such that water flows by gravity. In some embodiments, the water source 104 may be a dark in color—for example, black—so that the contained water may be heated via solar heating. The system 100 may include a valve 106 configured to regulate the flow of water from the water source 104. The valve 106 may be any suitable type of valve, such as a manually-controlled valve. In some embodiments, the valve 106 may be controlled automatically, for example, based on a water level in the vessel 112. The vessel 112 may be thermally isolative. For example, the vessel 112 may have a double-walled construction. Other thermally isolative configurations will be apparent to the skilled person in light of the present disclosure.

A support 122 is disposed within the vessel 112, and a substrate 120 is disposed on the support 122. As described above, the support 122 may be made from any suitable material, such as, for example, EPS foam. Also as described above, the substrate 120 may be made from a suitable wicking material, such as, for example, CCP. Other materials may be used for the support 122 and/or the substrate 120. The some embodiments, the support 122 is configured to float on water contained within the vessel 112. The substrate 120 may be configured to wick water contained within the vessel 112. The system 100 may include a solar concentrator 130—such as, for example, a Fresnel lens—for increasing the solar energy directed towards the substrate 120.

The system 100 further includes a housing 140, which may be in the shape of a cone, a dome, a pyramid, or any other shape suitable to the purpose as is described herein. The housing 140 is arranged to contain the vessel 112 within. In this way, water vapor evaporating from the water in the vessel 112 will condense on an inner surface of the housing 140 and run down the inner surface for collection in a collection container 150. The collection container 150 may be constructed so as to encourage condensation. For example, the collection container 150 may be constructed using a single-layer of material, such as a plastic or metal material. The system 100 may further include an outlet 152 whereby condensate (distillate) may be accessed for further use/storage.

Figure 25:
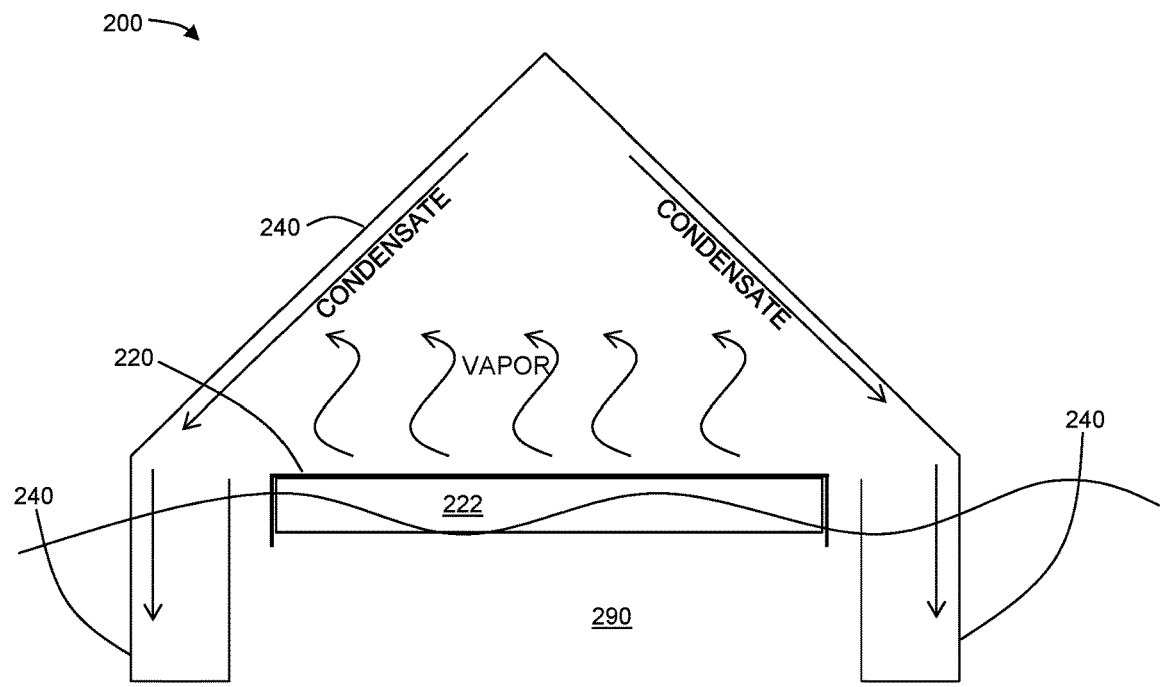
FIG. 25 is a diagram depicting another embodiment of the present disclosure.
Figure 26A:
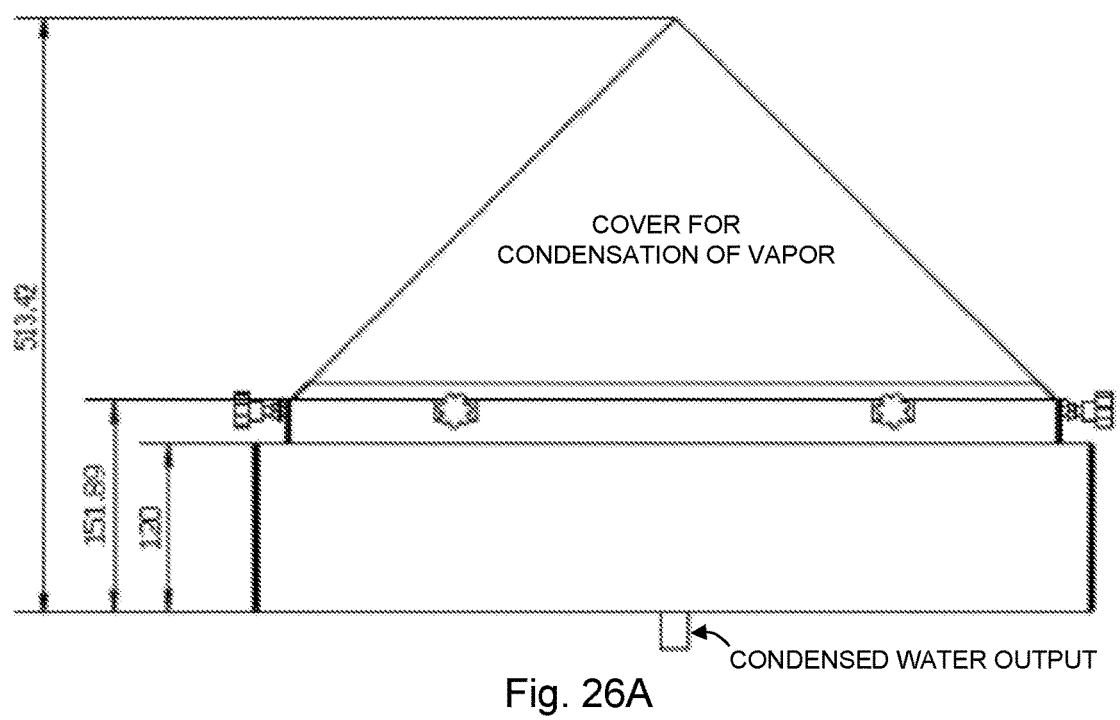
FIG. 26A is a side view of an exemplary solar still according to an embodiment of the present disclosure.
Figure 26B:
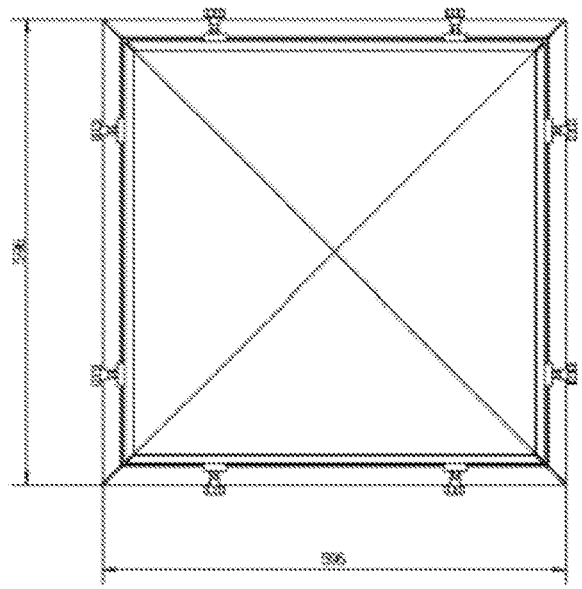
FIG. 26B is a top view diagram of the solar still of FIG. 26A.
Figure 26C:
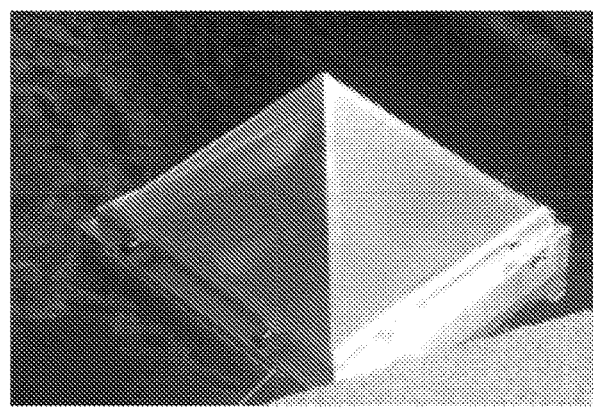
FIG. 26C is a photograph of the exemplary solar still constructed according to FIGS. 26A and 26B.

In another embodiment, a system 200 is configured to be used in a body of water 290 (see, e.g., FIG. 25). For example, the system 200 may be designed to float in a body of water 290, such as, for example, a lake, pond, river, man-made pools, etc. A substrate 220 is disposed on a support 222, and configured to wick water from the body of water 290 (e.g., the substrate 220 may overlap the support 222 and contact the water). The substrate 220 and support 222 may be CCP-EPS foam, or other suitable materials as further described in this disclosure. A housing 240 is configured to contain the substrate 220 and support 222. The housing 240 is arranged such that water vapor evaporated from the substrate 220 is contained within the housing 240 and caused to condense on an inner surface of the housing 240. The housing 240 includes a collection channel 242 arranged to collect condensate which forms on the inner surface of the housing 240. In this way, the condensate will run down the inner surface of the housing 240 into the collection channel 242 where it is collected for use/storage. In some embodiments, the collection channel 242 or a portion thereof is advantageously arranged to be disposed within the bulk water 290 such that the bulk water cools the collection channel 242.

In some embodiments, the support includes an air gap 323 between a portion of the substrate 320 and a portion of the support 322 (see, e.g., FIG. 27). Such an air gap may serve as a thermal isolator to minimize thermal dissipation into the bulk water.

Figure 28:
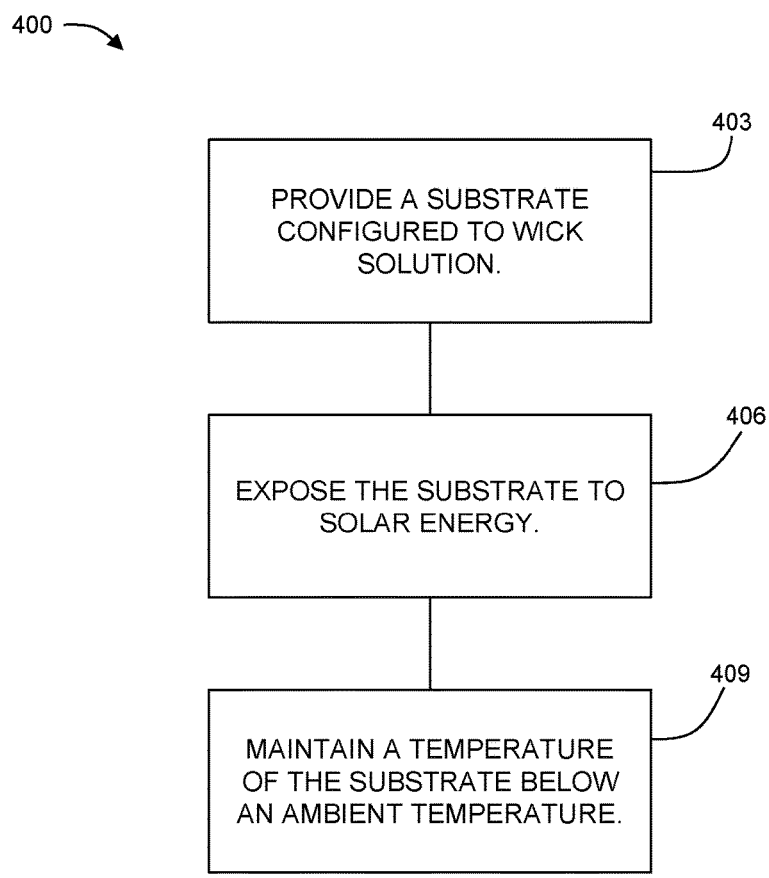
FIG. 28 is a chart depicting another embodiment of the present disclosure.

In another aspect, the present disclosure may be embodied as a method 400 for solar vapor generation including placing a solution, such as a water-based solution in an open-topped vessel (see, e.g., FIG. 28). A substrate may be disposed 403 in and/or on the solution.

The substrate may be configured in any way described herein. The substrate may be disposed 403 on the solution using a support, such as a foam support, to float the substrate at or near a top surface of the solution. The substrate is exposed 406 to solar energy thereby causing evaporation of the solvent (e.g., water), or increasing the rate of evaporation of the solvent over the rate at which evaporation would occur without a substrate and/or exposure to solar energy. The method 400 includes maintaining 409 the substrate at a temperature which is below the ambient temperature. The method may include moving air adjacent to the substrate to further increase the rate of evaporation and/or cool the substrate.

Some embodiments include chemically treating the substrate and/or the carbon to be more hydrophilic. In some embodiments, the substrate and/or the carbon is treated with sodium alginate.

As previously mentioned, in some embodiments, the subject invention provides methods and systems for solar distillation of water comprising a substrate on a support. The substrate may be referred to herein as a wick.

The sides, base, distillate channel, and collection container may each independently comprise metal, plastic or wood. The plastic may be acrylic. For the base, plastic or metal are preferred.

Figure 19A:
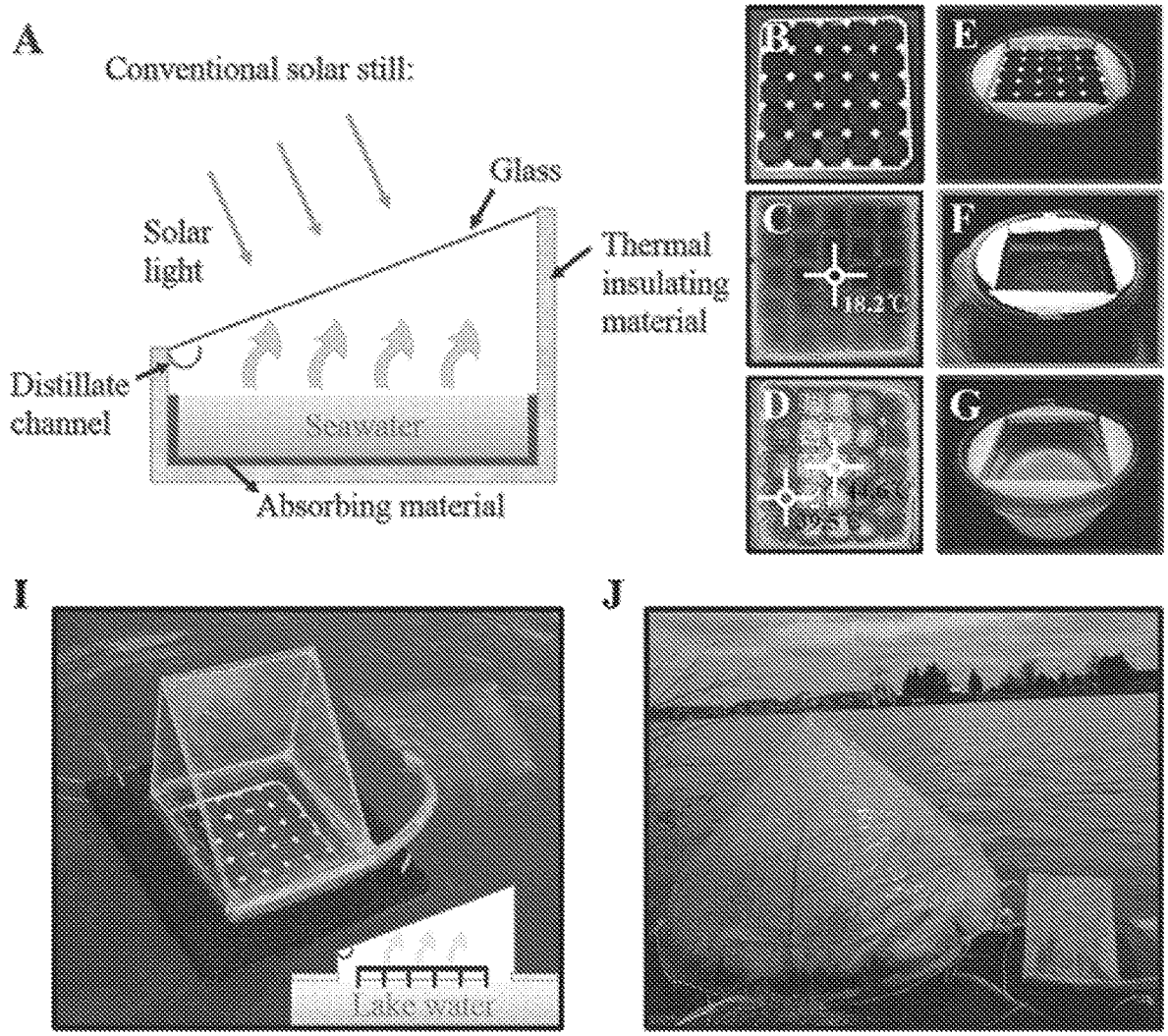
FIG. 19A (A) Schematic illustration of a conventional desalination solar still. (B) Photograph of a 5×5 CCP array with a total area of 100 cm$^2$ according to an embodiment of the present disclosure. (C) and (D) are thermal images of the CCP array before (C) and after (D) solar illumination. (E-G) Photographs of experimental systems with (E) a CCP-foam array on salt water, (F) bare salt water with a layer of black aluminum foil placed at the bottom, and (G) bare salt water with no CCP-foam. (I) The photograph of a prototype system placed outdoors on a lake. (J) The photograph of a control experiment with a commercial product (left) and the exemplary system (right) during the experiment. Condensation can be seen at the inner surfaces of the covers.

Optionally, foam or other material less dense than water may be added to ensure that the system floats (see, e.g., FIG. 19A(I)). For example, a foam ring or open square may be attached to the lower sides of the system.

In an alternative embodiment, at least an interior surface of the base may angled so that the substrate and its support are angled to face the sun.

Some embodiments of the presently-disclosed techniques are particularly advantageous for use in mining applications, and more particularly, in salt mining applications. Solar salt mining is a common practice to obtain a plethora of different salts ranging from table salt, NaCl, to Lithium-based salts (e.g., Lithium Carbonate, Lithium Hydroxide, Lithium Chloride, etc.), and Sodium/Potassium/Iodine salts for battery, food, and medical applications. While salt processing plants have the ability to process large amounts of raw salt product every year, these plants rarely run at full capacity due to bottlenecks in the production of raw salts from solar evaporation of salt brine. Using embodiments of the present disclosure, the solar evaporation of salt brines can be increased by 3-5× times the natural rate. A low cost carbon nanomaterial based substrate was developed and shown to be >88% efficient at converting solar light into heat (see below under the heading "CCP Discussion and Experimental Details"). This carbon substrate can easily be applied using a roll-to-roll process for extremely feasible scalability and modular systems, allowing the continued use of the existing infrastructure for solar evaporation ponds while providing greatly improved solutions to enhance salt production. To further maintain current infrastructure, the material used may be mechanically stable, thereby allowing the continued use of current collection vehicles to drive over and scoop up the raw salts. In addition to being low cost and scalable, the present carbon-based substrate is chemically inert as to prevent contamination and preserve purity of salt products.

In another aspect suitable for use in mining applications, the present disclosure may be embodied as an apparatus for improved salt separation in an evaporation pond. The apparatus is similar to the above-described system where the open-topped vessel is a pre-existing evaporation pond. As such, the apparatus includes a substrate configured to wick solution from the evaporation pond. The apparatus may include a support, configured to support the substrate at a position near the surface of the solution. A temperature of the substrate is maintained below an ambient temperature. The substrate of such an apparatus may be of any type described herein and may be configured as a planar sheet or a tent-shaped configuration as described herein.

In some embodiments, the substrate is configured in a geometric shape—i.e., having a geometric circumferential shape. In a particular example (illustrated in FIG. 8), the substrate is hexagonally shaped such that a plurality of substrates may be arrayed to cover a large area. Other shapes and array configurations will be apparent in light of the present disclosure and are within the scope of the disclosure.

The substrate may configured for mechanical separation of the salt. For example, the substrate may be a durable material capable of withstanding mechanical separation (scraping, beating, etc.) As such, the substrate may be reusable, such that once the salts have been removed (substantially removed), the substrate may be used to obtain salts again. In some embodiments, the substrate is washable. Here again, such ability to be washed allows for re-use of the substrate.

While solar salt mining focuses on the evaporation of brine water to collect the salts left behind, embodiments of the present system will also enable reclamation of the evaporated water in a condenser unit. In this way, miners and staff may be provided with a fresh supply of drinking water. This means for no additional energy input, other than the natural solar radiation, raw salt production can be enhanced 3-5× while saving time, money, and other resources associated with providing these often remote mining locations with clean drinking water.

Figure 10:
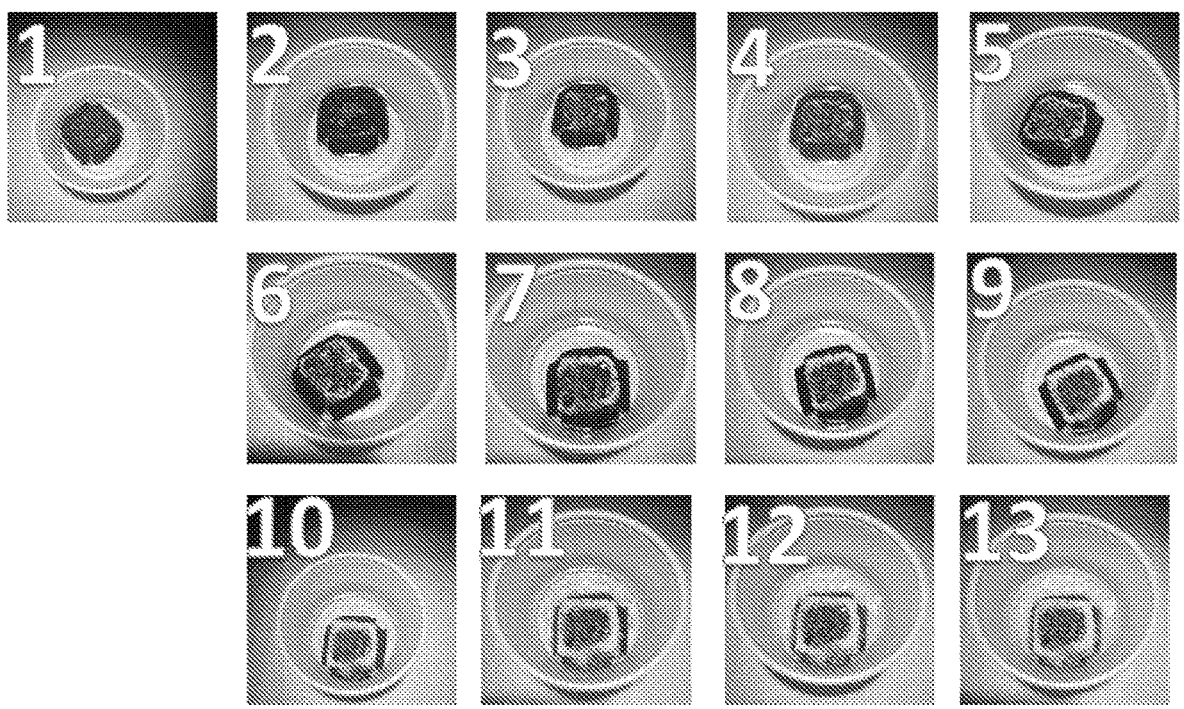
FIG. 10 shows an embodiment of the presently-disclosed carbon substrate in a NaCl brine under 1 sun illumination with a picture being recorded every 30 minutes. One can see the salt crystal accumulated on top of the black substrate surface, which will decrease the vapor evaporation rate. Intriguingly, the salt crystals tended to accumulate on the substrate surface (up to image 10), which may simplify the collection of salt in practice.
Figure 11:
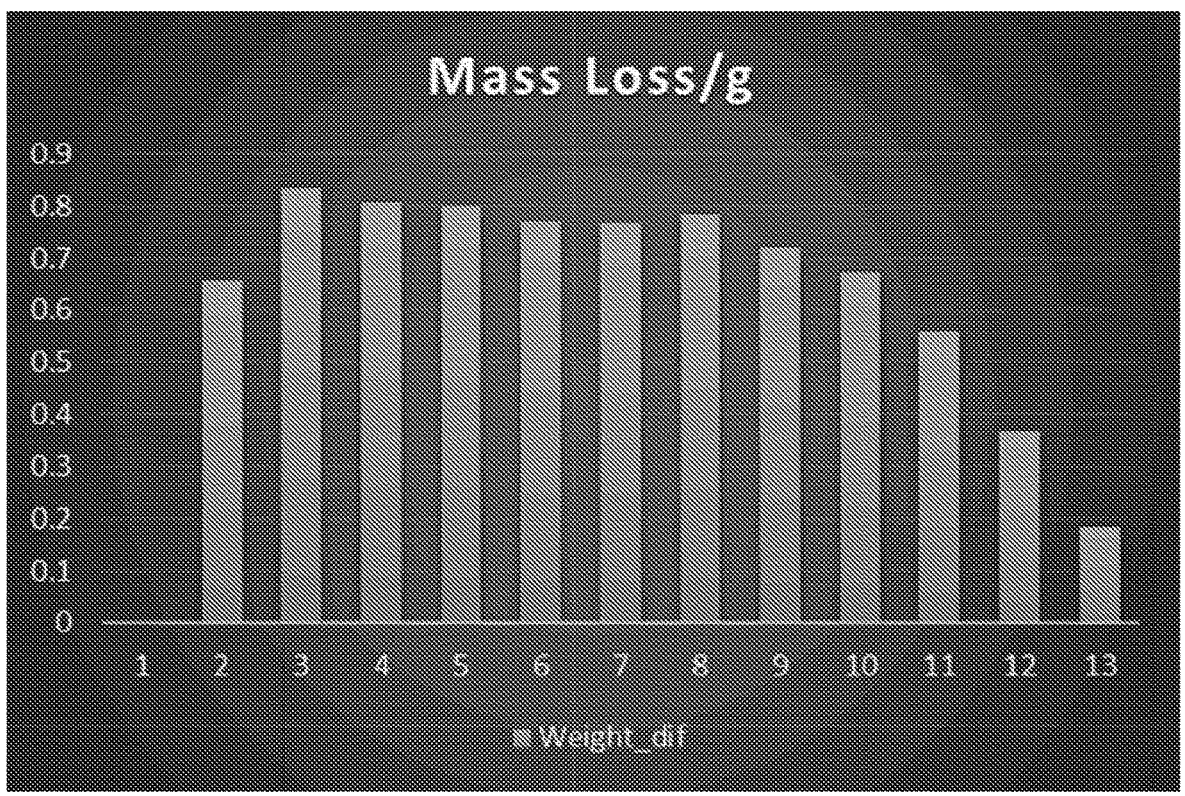
FIG. 11 shows the mass change over time of the sample under 1 sun illumination. Notice that as salt builds up on our material, only a slight decrease in performance is observed (up to image 10). Therefore, the performance of the salt collector should be very stable and can be replaced easily. Moreover, when the solar simulator is turned off after 8-hour illumination, the salt will be dissolved from the CCP surface back into the bulk water, demonstrating the minimum maintenance requirements.
Figure 12A:
FIGS. 12A and 12B show a preliminary experiment in an outdoor environment. Each container has 450 ml water with 40 gram salt. After 10 hour test (FIG. 12B), obvious salt can be obtained from the carbon substrate surface (left container) while the control sample did not have any output (right container). Therefore, the presently-disclosed strategy can be used for a solar mining using low concentration solution. At least 8 grams of salt were obtained from the carbon substrate surface in the experiment.
Figure 12B:

In addition, the CCP structure can also be applied to evaporation enhancement for water having only a low concentration of salt. In such applications, accumulated salt can re-dissolve into the water solution, providing a "self-cleaning" feature and reducing the maintenance required for operation. Additionally, FIG. 10 shows a test embodiment wherein salt tended to accumulate on the surface of the substrate. This tendency may provide an advantage in collecting the accumulated salt. For example, mechanical separation of the salt from the substrate may be easier if the majority of accumulated salt is on a surface of the substrate.

Figure 8:
FIG. 8 shows an apparatus used to characterize dark evaporation in controlled environment (a commercial glove box is 61 cm×46 cm×38 cm with controlled relative humidity and temperature inside the box).
Figure 9:
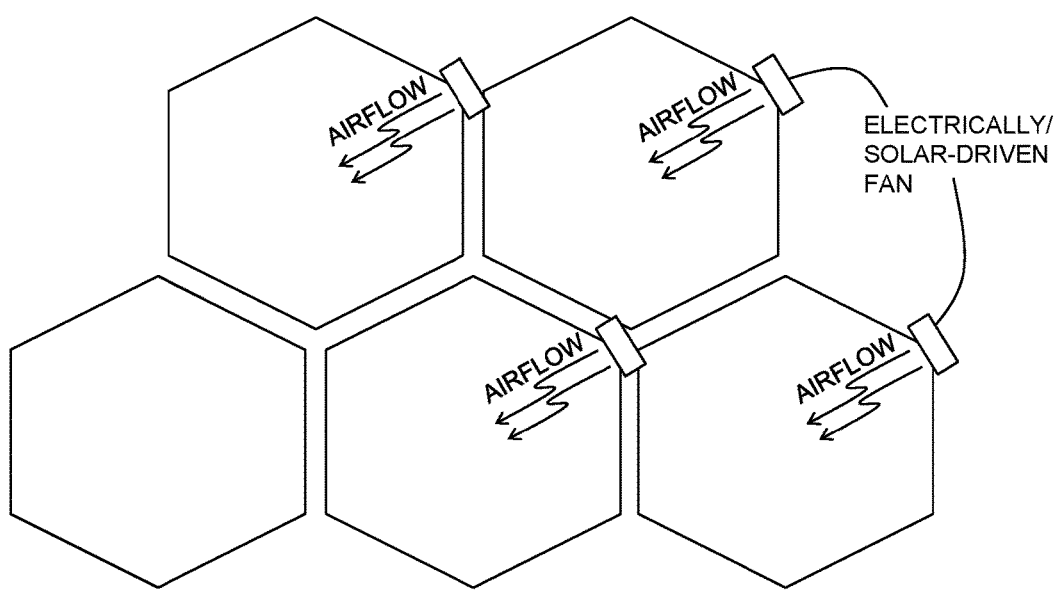
FIG. 9 is an illustration of an embodiment of a solar evaporator module floating on top of water surface, wherein each module contains an electricity/solar-driven fan to accelerate the convection.

Additionally, the presently-disclosed process includes the geometric assembly of the substrate. Based on geometry, the carbon substrate can be arranged to induce higher airflow speed which increases evaporation rates, prevents adsorption of salts onto the surface of the substrate and easily transfers salts to different collection containers, which aids in overall collection and ease of use/maintenance. As such, the apparatus for salt separation may include one or more air movers (for example, as shown in FIG. 8).

In contrast to water purification applications, solar mining may utilize extra components/devices to accelerate the vapor generation rate. For instance, electricity driven or solar driven fans can be employed in the solar vapor generation for salt mining. According to preliminary experiment results, an air flow from 0.4 to 2 m/s can enhance the vapor generation rate by 1000% (dark environment) ~15% (under 3× sun illumination). In particular, solar driven fans can be included in each solar evaporator model (FIG. 8). In addition, large scale fans can also be installed at the edge of the pond.

Further Discussion

Loss Channels in Solar Vapor Generation Systems and the Strategy to Realize the Perfect Efficiency As illustrated in FIG. 1A, major loss channels include net radiation, convection and conduction losses. Therefore, the power flux exchanged with the environment in the solar vapor generation process can be described as:

$$P = \alpha C_{opt} q_i - \varepsilon \sigma (T_2^4 - T_1^4) - h(T_2 - T_1) - q_{water} \quad (1)$$

Here, $\alpha$ is the optical absorption coefficient, $C_{opt}$ is the optical concentration, $q_i$ the normal direct solar irradiation (i.e., 1 kW/m² for 1 sun at AM 1.5), $\varepsilon$ the optical emission, $\sigma$ the Stefan-Boltzmann constant (i.e., 5.67×10⁻⁸ W/(m²·K⁴)), $T_2$ the temperature at the surface of the evaporative material, $T_1$ the temperature of the adjacent environment, h the convection heat transfer coefficient, and $q_{water}$ the heat flux to the bulk water. This equation describes most major processes (if not all) involved in the evaporation process, i.e., the absorption of light, $\alpha C_{opt} q_i$, the net radiative loss to the surroundings, $\varepsilon \sigma (T_2^4 - T_i^4)$, the convective loss to the ambient, $h(T_2 - T_1)$, and the radiative and conductive loss to the bulk water, $q_{water}$. By manipulating the energy distribution among these channels, unique solar vapor generation mechanisms can be realized. For instance, a selective absorber and a bubble wrap cover can be introduced to decrease the infrared thermal radiation ($\varepsilon$) and the convective loss (h) to the surroundings, respectively, to produce 100° C. steam under one sun illumination. However, for high temperature solar vapor generation systems, these losses can only be reduced but not eliminated completely. An important question is what happens when $T_2 \leq T_1$? In this steady case (with a stable surface temperature), the system will actually take energy from the environment and the absorbed solar energy can only be consumed in the liquid-to-vapor phase transition, corresponding to near perfect solar energy conversion. Next, a thermally isolated CCP on foam was employed as a low-cost test bed to analyze the energy balance and heat transfers under both dark and illuminated conditions.

Experimental Embodiments and Results
Materials

In an exemplary embodiment, a substrate of carbon-coated cellulose and polyester blend (CCP) was fabricated using commercially available materials: paper (Texwipe™ TX609) and carbon powder (Sid Richardson Carbon & Energy Company). In some embodiments, evaporation performance can be further manipulated by engineering features of carbon nanomaterials. For example, the light-absorbing substrate can be enhanced with hydrophilic features. In particular, it may be advantageous to provide a substrate that comprises a black material able to absorb water and sunlight simultaneously and evaporate moisture at a higher rate. To improve these characteristics, the porosity of a carbon nanomaterial may be manipulated in some embodiments. In some embodiments, the substrate and/or the carbon may be chemically treated to increase hydrophilicity. In some embodiments, the substrate and/or the carbon may be treated with sodium alginate.

In an experiment to demonstrate such features, water diffusion height was employed as the figure of merit to evaluate the absorptivity of materials under test (FIG. 5A). In the experiment, water diffusion height was measured in substrates made from three sample materials: a first sample comprising a white substrate (left sample); a second sample comprising a substrate coated with a carbon nanomaterial (center sample); and a third sample comprising a carbon-coated substrate similar to the second sample and further treated with sodium alginate (right sample). As shown by the infrared imaging in FIG. 5B, the water diffusion height of the first sample was approximately 23 cm. In the second sample, water diffusion height was approximately 37 cm, demonstrating improved water absorptivity in the CCP material. In the third sample, the hydrophilicity of the sample was improved by the sodium alginate, resulting in a water diffusion height of approximately 43 cm.

Methods
Sample Fabrication 2 g carbon powder was dispersed into 400 mL water. 8 mL acetic acid was added to make carbon powder easier to attach to fibers. The solution was mixed in a 1000 ml beaker and blended well using an ultrasonic cleaner (Branson Ultrasonics Bransonic® B200) for 5 minutes. Subsequently, the prepared white substrate was put into the mixed solution to vibrate and stir for 3 minutes so that carbon powders can dye the substrate uniformly. After that, the CCP was dried at 80° C. on a heating stage. This procedure was repeated three to four times to realize a desired dark color.

Sample Characterization

Figure 6:
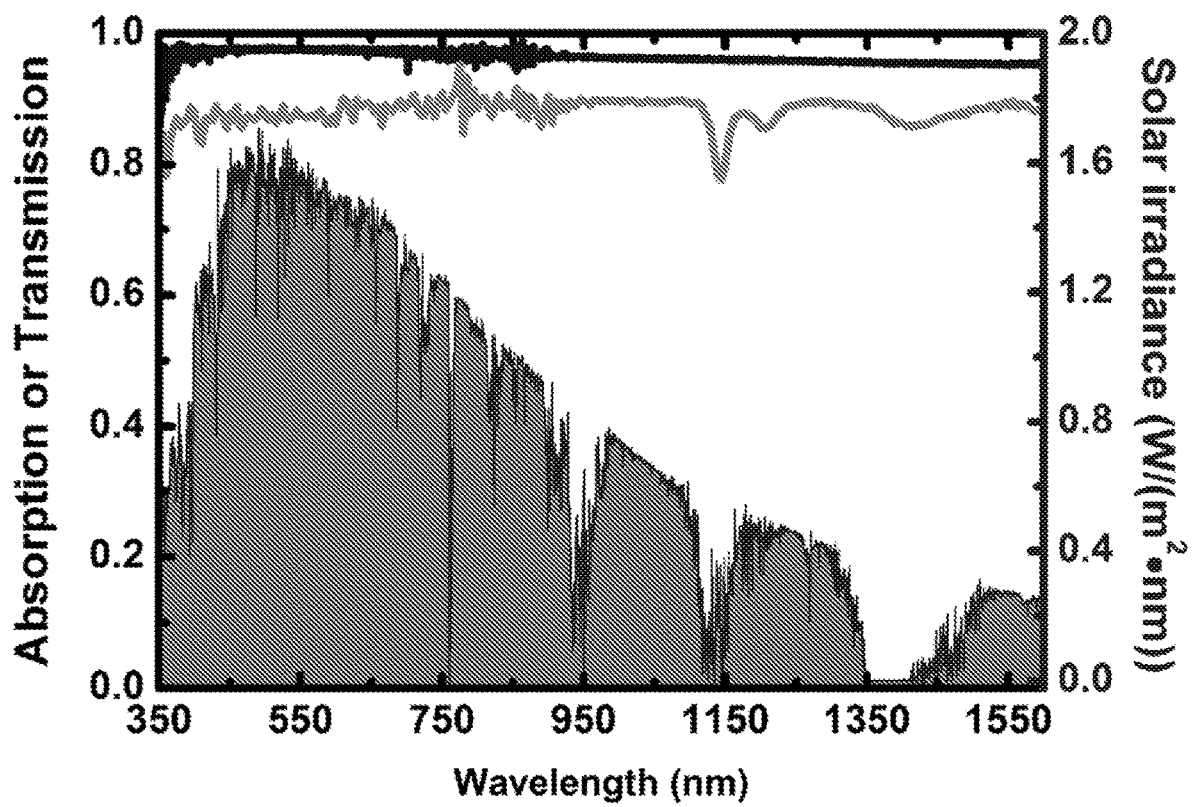
FIG. 6 shows the optical absorption spectrum of the CCP and the transmission spectrum of the diffuser. The absorption is ~96.9% by weighting absorption spectrum (topmost curve) with the AM 1.5 solar irradiance, which contributes to a high efficiency. The shaded area shows the solar irradiation spectrum as a reference. The transmission spectrum (middle curve) indicates that the transmitted light by the diffuser will basically keep the energy distribution of AM 1.5 at different wavelengths.

The absorption spectrum using an integration sphere spectroscopy (Thorlabs IS200-4 integrated with Ocean Optics USB2000+, Ocean Optics Jaz, and Avantes AvaSpec-NIR256-1.7TEC for ultraviolet, visible and infrared wavelength range, respectively). By weighting optical absorption spectrum of CCP (the topmost curve in FIG. 6) with the AM 1.5 solar irradiance, the optical absorption was ~96.9%.

Solar Vapor Generation

Figure 7:
FIG. 7 shows an experimental setup for solar vapor generation. CCP-foam is illuminated using the solar simulator.

To measure the water evaporation rate, a 150 mL beaker with an inner diameter of 5 cm filled with ~140 g water was placed under an intensity-tunable solar simulator (Newport 69920), as shown in FIG. 7. Three pieces of diffuser (10 inch×8 inch×0.050 inch polystyrene sheet, Plaskolite) were used to generate a uniform light distribution. As shown by the middle curve in FIG. 6, the overall transmission spectrum was almost wavelength-independent. Therefore the diffuser will not change the spectral feature of the incident light. The solar light intensity was measured using a power meter (PM100D, Thorlabs Inc.) equipped with a thermal sensor (S305C, Thorlabs Inc.) at the same height of the CCP. The CCP was first illuminated for approximately 30 minutes for stabilization. Then the evaporation weight change was measured by an electronic scale (U.S. Solid, with the resolution of 1 mg) every 10 minutes. The surface temperature of CCP was characterized using a portable thermal imager (FLIR ONE®). To calibrate the temperature, a piece of white substrate without illumination was adopted as a reference for room temperature in the same thermal imaging. Its temperature shown in the thermal distribution image was calibrated by a thermometer (GoerTek). In this case, the error in the temperature characterization due to distance from the sample to the thermal imager can be minimized.

Dark Evaporation

Water evaporation is a natural process which occurs under any conditions regardless of solar illumination. As shown in FIG. 1B, a 19.6 cm² CCP was attached to a foam substrate floating on top of water. Its surface thermal distribution was then characterized using a portable thermal imager (FLIR ONE®). The dark evaporation rate of bare water surface was characterized in a glove box with controlled relative humidity and temperature (ETS Model 5501-11, electro-tech system, Inc., FIG. 8). In this experiment, two sets of measurements were performed by fixing the relative humidity and temperature inside the box, respectively. Each condition was stabilized for 1 hour before the characterization.

One can see that the surface temperature of the CCP is ~14.3±0.2° C. ($T_2$), which is lower than that of the room temperature (i.e., $T_1$=22.3-23.3° C.). This was characterized in a laboratory environment (with the humidity of 16~25% in winter time at Buffalo, N.Y.) showing that the average evaporation rate in the dark environment was 0.275 kg/

(m²·h). Due to natural evaporation, this process will consume $6.78 \times 10^5$ J/(m²·h) energy from the environment (considering the enthalpy of vaporization at 14.3° C.). Therefore, the energy balance and heat transfer diagram under dark environment (or low intensity illumination condition) is different from that in a previously reported solar heating situation. As shown in FIG. 1C, the heat transfer is actually from the environment to the CCP surface due to the lower temperature of the sample. According to equation (1), the convective input power, $P_{com} = -h(T_2 - T_1)$, is approximately $2.88 \times 10^5$ J/(m²·h) (h was assumed to be 10 W/(m²·K)) under dark conditions. This heat transfer direction is valid as long as the CCP surface temperature is lower than the surrounding temperature. In addition, the system has no net radiation loss when $T_2 < T_1$. Instead, according to the equation $P_{rad} = -\varepsilon \sigma (T_2^4 - T_i^4)$ ($\varepsilon$ is 0.969 for the CCP, FIG. 6), the radiative input power can be calculated to be $1.56 \times 10^5$ J/(m²·h). The remaining input is contributed by $q_{water}$ from the substrate dipped in the water and the foam substrate (although it is suppressed significantly). Therefore, the CCP foam system actually takes energy from the environment rather than losing it. From this standpoint, an advantageous material/structure for solar vapor generation should have a higher evaporation rate under dark conditions in oder to achieve a lower equilibrium temperature. As a result of this insight, the foam under the CCP was removed so as to introduce an air gap (CCP-air-foam), the evaporation rate was then enhanced to 0.340 kg/(m²·h), resulting in a lower temperature of ~13.6° C. at the CCP surface as shown in FIG. 1D. To examine how this arrangement influences solar vapor generation, light illumination was used to accelerate the vapor generation.

Low Intensity Illumination

In this experiment, a solar simulator (Newport) was employed to illuminate the CCP samples (FIGS. 2A and 7). The light beam was filtered by an optical diffuser (FIG. 6) to get a more uniform beam spot with the power density of ~0.6 kW/m² (i.e., equivalent to the power of 0.6 Sun at AM 1.5). However, the temperature distribution was not uniform even under uniform solar illumination. One can see that the surface temperature of the central part of the CCP-foam sample (upper panel in FIG. 2B) increased up to 35.3° C., while the CCP-air-foam (lower panel in FIG. 2B) surface temperature increased up to 29.7° C. They are both higher than the room temperature. Therefore, the loss channels highlighted in FIG. 1A will result in lower solar energy conversion efficiency in these areas. One can see from FIG. 2C that these measured average evaporation rates (i.e., 0.68 kg/(m²·h) and 0.80 kg/(m²·h)) are both below the upper limit that can be produced by the input solar energy (i.e., 0.90 kg/(m²·h), the solid curve). It should be noted that the CCP-air-foam sample realized a better vapor generation rate under the same illumination, confirmed by its lower surface temperature.

To minimize these loss channels, the incident power was reduced to ~0.2 kW/m². As shown by the upper panel in FIG. 2D, the central area temperature of the CCP-foam structure was reduced to 22.9° C. Other areas on this sample are all below room temperature. In addition, the highest temperature of the CCP-air-foam structure was 20.1° C. (lower panel in FIG. 2D), all below room temperature. Under this situation (i.e., FIG. 1C), a total vapor generation rate of 0.39 kg/(m²·h) was obtained for the CCP-foam sample and 0.48 kg/(m²·h) for the CCP-air-foam sample, respectively, as shown by spheres in FIG. 2E. Remarkably, they are all beyond the theoretical upper limit of the vapor generation rate that can be produced by the input solar energy (i.e., ~0.30 kg/(m²·h), the solid curve in FIG. 2E). It should be noted that the dark evaporation "background" was not subtracted for the reasons discussed below.

The Background Evaporation

In previously reported solar vapor generation literature, the dark evaporation was usually considered as a background which was subtracted from the total vapor generation to obtain the net solar-induced vapor generation. However, by simply comparing FIGS. 1A and 1C, one can see that the energy balance and heat flow direction under dark conditions were different from those under illuminated conditions. To test this argument, one can simply turn off the solar light and characterize the remaining evaporation rate immediately. Since the surface temperature cannot return to the sub-room-temperature operation immediately, the dark evaporation is not the "background" of the solar vapor generation. Then the question is: What is the "background"? Or, is there any "background" for solar evaporation?

Figure 3:
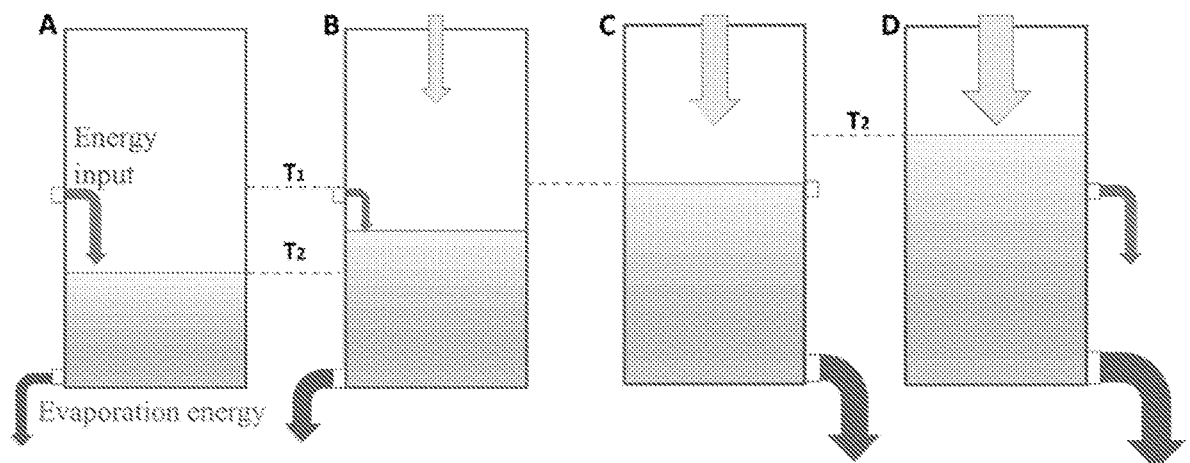
FIG. 3 shows the physical interpretation of energy balance of solar vapor generation systems. (A) Energy flow diagram under dark conditions: the input energy from the environment is in balance with the evaporation energy. (B) Energy flow diagram of a below-room-temperature system with a weak light input: the output evaporation energy is the sum of the light input and the environment input. (C) Energy flow diagram of a room-temperature system: the output evaporation energy is in balance with the surrounding and light input. (D) Energy flow diagram of a hot system: the input solar energy is the sum of the evaporation energy and the loss to the environment.

To interpret this intriguing problem, here the energy balance was analyzed using a "water container" model, as illustrated in FIG. 3. Under dark conditions (FIG. 3A), the system took energy from the environment. The energy lost to natural evaporation, $P_{out}$, was in balance with the input energy ($P_{in}$) from convection, conduction, radiation and others (if any). The system temperature $T_2$ was lower than the room temperature $T_1$, and was dependent on the intrinsic evaporation capability of the system under this environment (including temperature, humidity, pressure, system architecture, etc., FIG. 8 and Table 1 below). When a solar energy input was introduced as shown in FIG. 3B, the system temperature increased. During this unsteady process, the system held more energy from the solar input due to its thermal capacity. When the system temperature increased up to the room temperature (FIG. 3C), the input energy channel from the environment closed. Ultimately, the output energy consumed by the evaporation was in balance with the input solar energy with 100% conversion efficiency under the new steady state. When the input solar energy was increased further (FIG. 3D), the system temperature $T_2$ was higher than $T_1$. Then the energy was lost through conduction, convection and radiation channels. In this case, the evaporation energy was always smaller than the input energy. Therefore, the absorbed solar energy conversion efficiency was definitely smaller than 100% and the obtained vapor generation rate could not surpass the theoretical upper limit. In particular, when the light was turned off, the evaporation rate did not change immediately due to the stored thermal energy in the system. One can see that in this process, no dark "background" should be considered since there was no energy flow from the environment to the system (as illustrated in FIG. 3A). Importantly, this physical picture pointed out a strategy to realize the vapor generation rate beyond the solar upper limit, as will be discussed in the next section.

TABLE 1

Measured dark evaporation rates of a bare water surface in controlled environment.

| Relative humidity at the temperature of ~23.6° C. | Rate (kg/(m²·h)) | Temperature (° C.) at the relative humility of ~26% | Rate (kg/(m²·h)) |
|---|---|---|---|
| 26% ± 1% | 0.0955 | 23 ± 0.8 | 0.1009 |
| 46% ± 1% | 0.0787 | 27 ± 0.8 | 0.1070 |
| 66% ± 1% | 0.0465 | 31 ± 0.8 | 0.1315 |

Figure 4A:
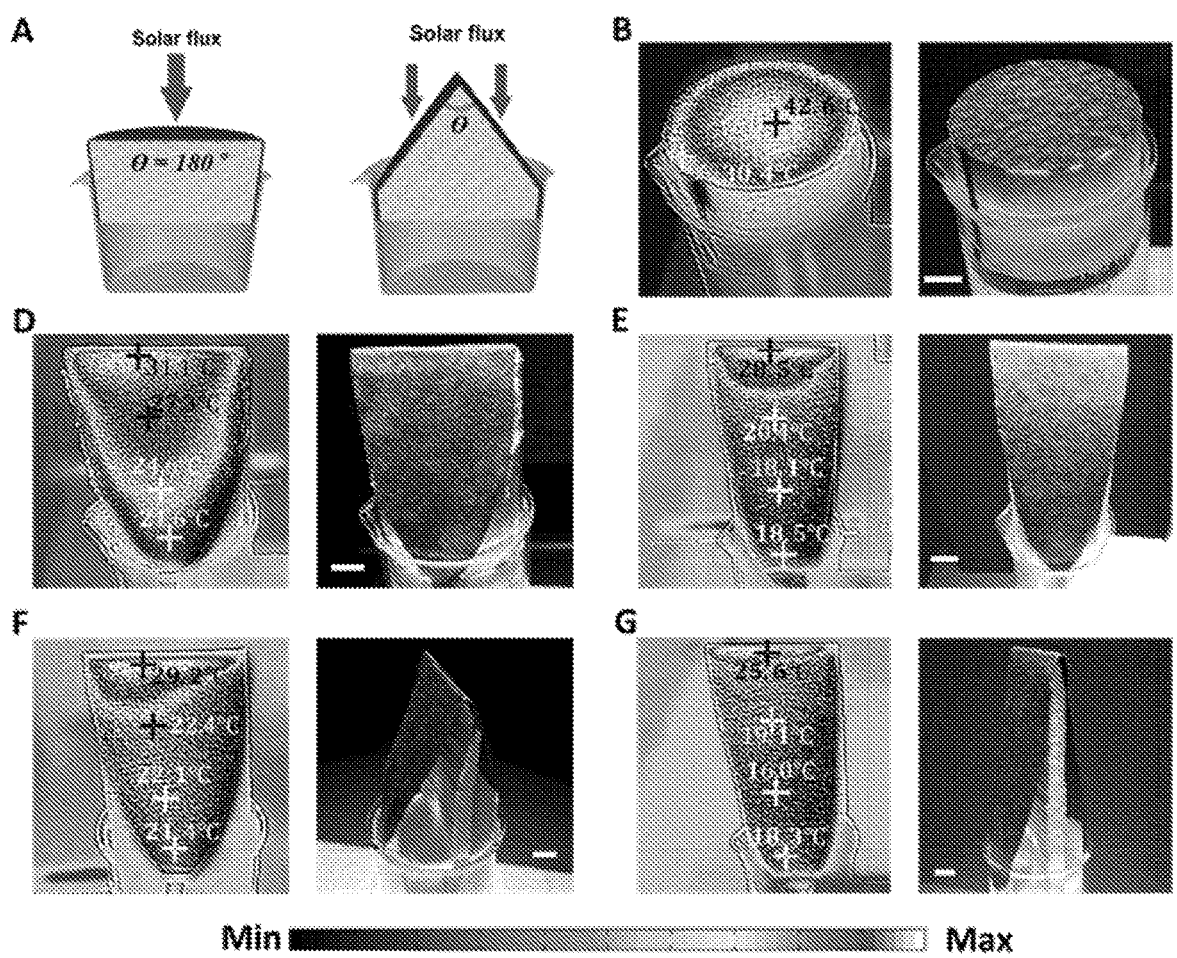
FIGS. 4A and 4B show the increased surface area under 1 sun illumination. (4A(A)) Exemplary schematic diagram to reduce the light density by introducing larger surface area structures. (4A(B), 4A(D)-4A(E)) Thermal distribution images and corresponding photographs of three exemplary samples (4A(B)) a flat CCP-foam, (4A(D)) a triangle structure with θ of 37.8°, (4A(E)) a triangle structure with θ of 22.9°. (4B(C)) Comparison of measured water weight change versus time of the three exemplary CCP-foam samples (spheres)—wherein the calculated upper limits that can be produced by 1 sun input solar energy are plotted by solid curves. (4A(F)-4A(G)) The thermal distribution images and corresponding photographs of CCP-air gap-foam structures with (4A(F)) θ=37.4° and (4A(G)) θ=22.4°. (4B(H)) Comparison of measured water weight change versus time of these two CCP-air gap-foam samples (spheres)—wherein the calculated upper limits that can be produced by 1 sun input solar energy are plotted by solid curves.

Surpassing the Solar Upper Limit: Reducing the Power Density using Larger Surface Areas As illustrated in FIG. 3B, below-room-temperature operation allows for obtaining total vapor generation rates that surpass the solar input limit (FIG. 2E). However, due to the weak solar illumination, the total vapor generation rate was still relatively low. A first embodiment for realizing this below-room-temperature strategy under a practical 1 sun illumination is to increase the actual surface area within a given projection area, for example, as illustrated in FIG. 4A(A). To demonstrate this strategy, a set of triangle structures was fabricated with different apex angles (θ) and their surface temperature distributions was compared with a flat sample. As shown in FIG. 4A(B), the highest temperature on the flat CCP sample was 42.6° C. The measured mass change and the theoretical upper limit data were plotted in FIG. 4B(C). Since the surface temperature of the flat CCP sample was higher than the room temperature, corresponding to the lossy system in FIG. 3D, the measured vapor generation rate (~1.21 kg/(m²·h), see top set of spheres) was lower than that of the theoretical limit (~1.58 kg/(m²·h), the top curve).

Figure 4B:
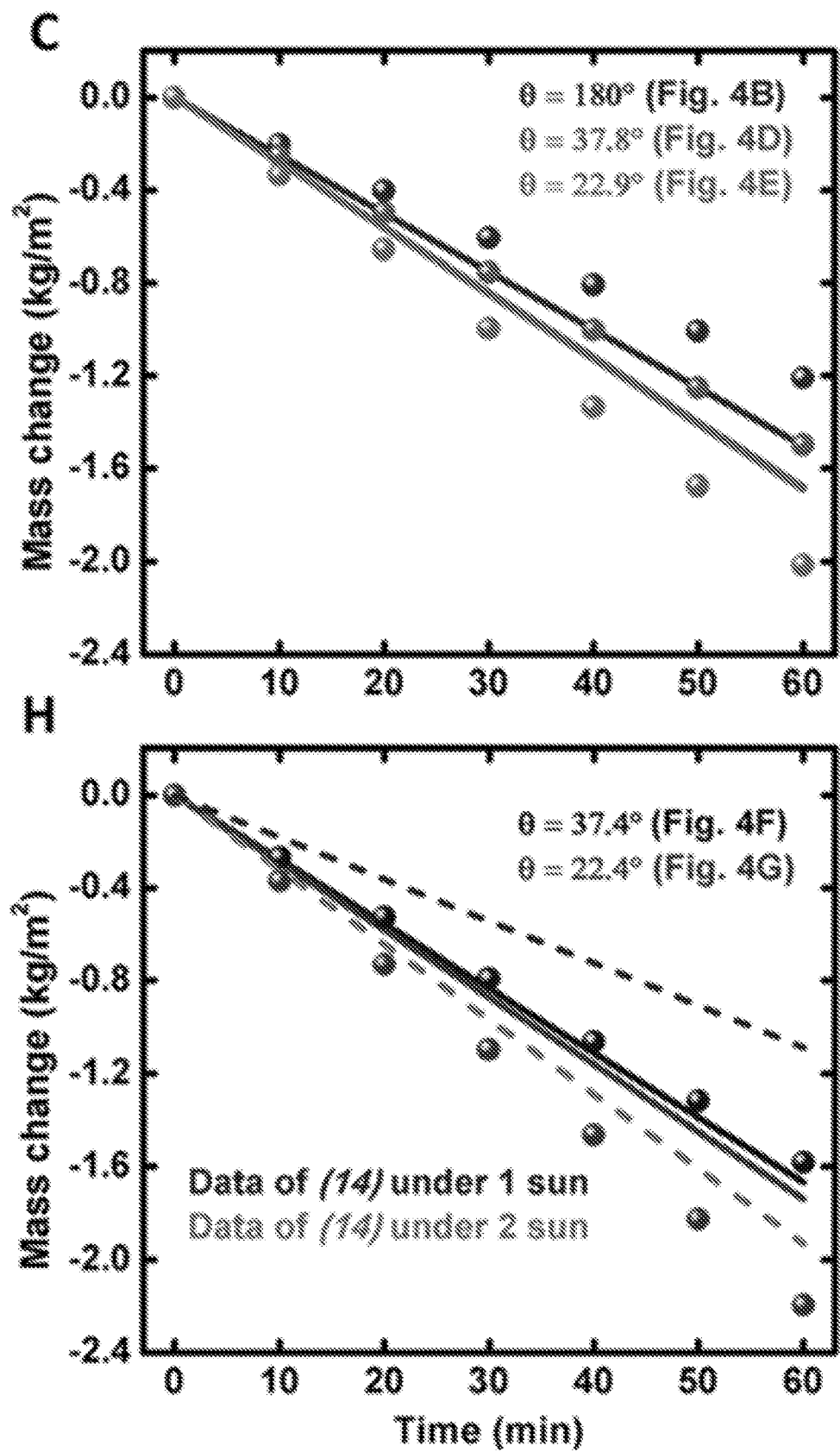

When the same light was employed to illuminate the triangle samples with larger surface areas (FIGS. 4A(D)-4A(E)), the temperature decreased significantly compared with the flat sample shown in FIG. 4A(B). Here four temperature points are indicated at different areas along the side walls. One can see that a major area of the sample in FIG. 4A(D) (θ=39°) was still higher than the room temperature. As a result, a total evaporation rate of ~1.50 kg/(m²·h) was observed, which was ~88.9% of the input solar energy (see middle set of spheres and the bottom curve in FIG. 4B(C)). This efficiency was improved compared with the flat CCP sample in FIG. 4A(B). More intriguingly, for the sample with larger surface areas (θ=23°) as shown in FIG. 4A(E), the surface temperature was decreased further with major areas below-room-temperature. In this case, a total vapor generation rate of ~2.02 kg/(m²·h) was observed (bottom set of spheres in FIG. 4B(C)), which was higher than the theoretical upper limit (~1.65 kg/(m²·h), see the bottom curve in FIG. 4B(C) and Table 2 below). Ultimately, the foam under these two triangle samples was removed to get CCP-air triangle samples to further enhance the convection contribution from the surroundings and accelerate the evaporation rate. As shown by FIGS. 4A(F)-4A(G), the surface temperatures can be reduced further under the same illumination conditions, indicating the improved vapor generation rates. As shown in FIG. 4B(H), total vapor generation rates of 1.58 kg/(m²·h) were obtained for the sample in FIG. 4A(F) and 2.20 kg/(m²·h) for the sample in FIG. 4A(G), respectively. In particular, the best result of 2.20 kg/(m²·h) was even faster than those reported by other systems under 1~2 sun illumination (e.g., ~1.09 kg/(m²·h) under 1 sun and ~1.93 kg/(m²·h) under 2 sun reported by others, see dashed lines in FIG. 4B(H)). This encouraging result indicates the potential to realize ultra-efficient and high performance solar stills based on extremely low cost materials.

TABLE 2

The values of solar intensity and the enthalpy of evaporation used in the calculation.

|  | Solar intensity (kW/m²) | Enthalpy of evaporation (J/g) |
|---|---|---|
| Upper panel of FIG. 2B | 0.609 | 2419.5 |
| Lower panel of FIG. 2B | 0.600 | 2435.7 |
| Upper panel of FIG. 2D | 0.203 | 2448.2 |
| Lower panel of FIG. 2D | 0.203 | 2453.6 |
| Left panels of FIG. 4A(B) | 1.001 | 2399.9 |
| Left panels of FIG. 4A(D) | 1.136 | 2433.9 |
| Left panels of FIG. 4A(E) | 1.146 | 2439.1 |
| Left panels of FIG. 4A(F) | 1.127 | 2437.1 |
| Left panels of FIG. 4A(G) | 1.181 | 2444.2 |

Calculation of the Solar Vapor Generation Rate

In describing the present techniques for limit-breaking solar vapor generation rate beyond the input solar energy limit, the theoretical upper limit was estimated as described below.

In this calculation, the solar energy was assumed to transfer solely to the liquid-vapor transition without any other losses. Therefore, the obtained solar vapor generation rate was equal to the solar intensity (J/(m²·h)) divided by the enthalpy of evaporation (J/kg).

The solar intensity was measured by placing the aforementioned S305C thermal sensor perpendicular to the light beam. For triangle structures shown in FIGS. 4A and 4B, the solar intensity at different height was slightly different due to the diffraction of the beam. In this case, the highest value at the top position was employed to calculate the theoretical upper limit so that the limit-breaking experiment result is unambiguous. For instance, in the left panel of FIG. 4A(G), the strongest illumination at the top of the triangle sample, 1.181 sun as the solar intensity (i.e., 1.181 kW/m²=4.2516×10⁶ J/(m²·h)) was employed.

Figure 2:
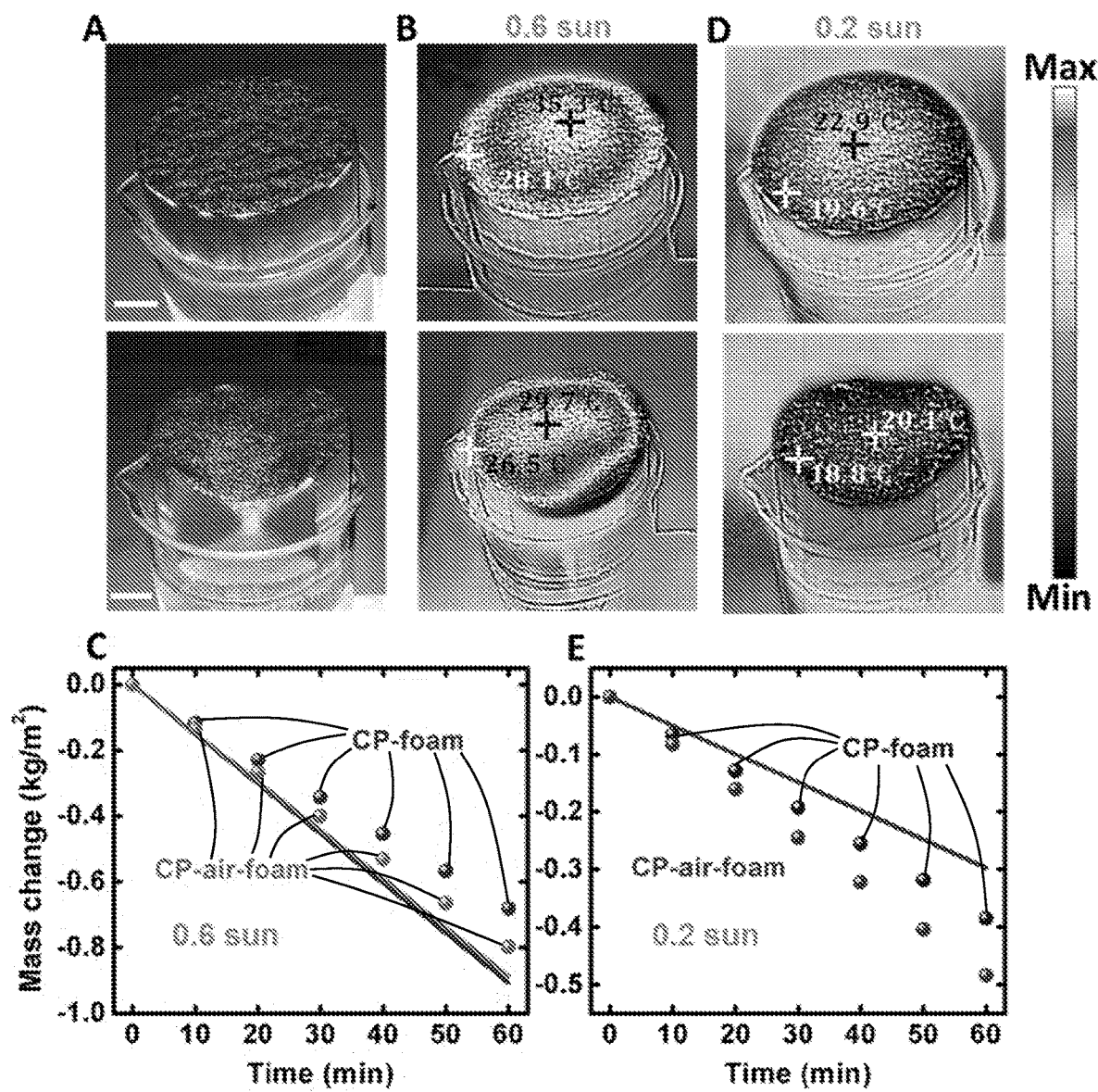
FIG. 2 shows vapor generation under low density light illumination. (A) Photographs of a CCP-foam (upper panel) and a CCP-air gap-foam (lower panel) under 0.6 sun illumination. (B) Thermal images of the CCP-foam (upper panel) and the CCP-air gap-foam (lower panel) under 0.6 sun illumination. (C) Comparison of measured water weight change versus time of CCP-foam and CCP-air gap-foam. The upper limit that can be produced by 0.6 sun input solar energy is plotted by the solid curve. (D) Thermal images of the CCP-foam (upper panel) and the CCP-air gap-foam (lower panel) under 0.2 sun illumination. (E) Comparison of measured water weight change versus time of CCP-foam and CCP-air gap-foam. The upper limit that can be produced by 0.2 sun input solar energy is plotted by the solid curve.

The enthalpy of evaporation is temperature dependent. Therefore, an analysis was performed of the temperature distribution on the CCP surface, which was non-uniform (FIGS. 2 and 4). The energy flow condition varied on the same CCP sample due to the non-uniform temperature distribution. Since the enthalpy of evaporation is smaller at higher temperature, the enthalpy of evaporation corresponding to the highest temperature on the CCP surface was selected to calculate the theoretical upper limit. For example, in the left panel of FIG. 4A(G), the enthalpy of evaporation of 2444.2 J/g (i.e., 2.4442×10⁶ J/kg) at 25.6° C. was adopted (i.e., the highest temperature on the CCP surface). Under the 1.181 sun solar illumination, the theoretical upper limit of the vapor generation rate was 1.739 kg/(m²·h). Considering the actual optical absorption of ~96.9%, the theoretical upper limit was 1.685 kg/(m²·h). All values used in the calculation are listed in Table 2 above.

CCP Discussion and Experimental Details

CCP for Solar Vapor Generation

A hydrophilic porous material, a fiber-rich nonwoven 55% cellulose/45% polyester blend (TechniCloth™ Wiper TX609, available from Texwipe™) was selected for use in a test embodiment. This substrate was chosen for its extremely low cost (i.e., retail price of ~$1.05/m²), chemical-binder-free make up, and has excellent water transport properties. Its microstructure is shown in FIG. 14A, having 10-20-μm-wide fiber bundles. The substrate was dyed using low cost carbon black powders (e.g., SidRichardson Carbon & Energy Co., retail price of $2.26/lb).

Sample preparation: 0.8 g carbon powder (Sid Richardson Carbon & Energy Co.) was dispersed into a 160 mL water. 3 mL acetic acid was added to make carbon powder easier to attach to fibers. The mixed solution was blended well using an ultrasonic cleaner (Branson Ultrasonics Bransonic™ B200) for 5 minutes. Subsequently, the 2 cm×2 cm white paper (TechniCloth™ Wiper TX609, available from Texwipe™) was put into the mixed solution to vibrate for 3 minutes so that carbon powders can dye the paper uniformly. After that, the CCP was dried at 80° C. on a heating stage. This procedure was repeated three to four times to realize a dark shade (see FIG. 14C).

As a result of the dying process, the fibers were coated with carbon nanoparticles, as shown in FIG. 14B. The direct comparison between the white paper and the carbon-coated paper is shown in the inset of FIG. 14C. The optical absorption of the CCP was very strong with the average absorption of ~98% throughout the visible to near IR domain (from 250 nm to 2.5 μm, measured by a spectrophotometer equipped with an integration sphere, Shimadzu UV-3150). This strong broadband optical absorption is particularly useful for low-cost solar-to-heat conversion.

Figure 20:
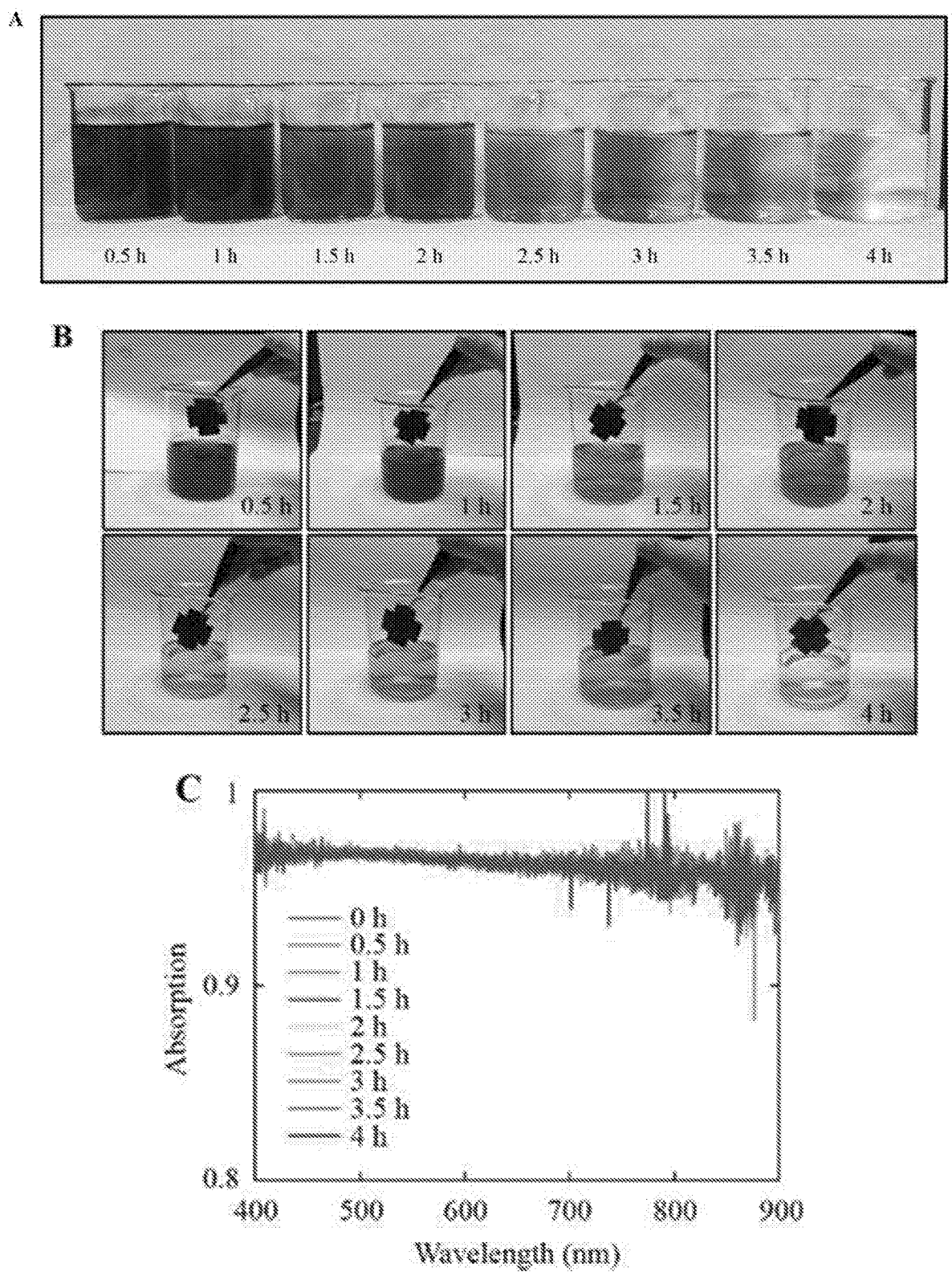
FIG. 20 (A) Comparison of the water solution used to ultrasonically clean a CCP sample after different amounts of time. (B) Photographs of the CCP sample after different amounts of ultrasonic cleaning time. (C) Optical absorption spectra of the CCP sample after ultrasonic cleaning.

Stability/durability test: To demonstrate the stability/durability of carbon powder attached on the paper fibers, a CCP sample was cleaned ultrasonically in clean water. The water solution was changed every 30 minutes to visualize the effect of the ultrasonic cleaning. As shown in FIG. 20A, the amount of carbon powder washed from the CCP decreased gradually. After 4 hours, no obvious carbon powder was visible in the water. It was noted that there was no apparent change in the shade of the CCP sample (FIG. 20B). To evaluate the cleaning effect of the ultrasonic vibration process, the absorption spectrum was characterized using an integration sphere spectroscopy (Thorlabs IS200-4 integrated with Ocean Optics Jaz) and the optical performance was confirmed as was almost unchanged (FIG. 20C). This test provided strong evidence to demonstrate the great durability of the CCP sample.

To demonstrate the baseline for solar vapor generation performance, a direct comparison was performed under several different conditions as shown in FIG. 14D.

To measure the water evaporation rate, a 250 mL beaker (open area of the beaker was 35.3 cm$^2$) filled with ~165 g water was placed under a solar simulator (Newport 69920). The CCP floated on the water surface with or without the EPS foam. The residual water surface was covered by EPS foam to eliminate natural evaporation. Two pieces of Fresnel lens (26 cm×17.8 cm, focal length: 300 mm, OpticLens) were used to concentrate solar light. 1-10 times concentrated solar light was calibrated using a powermeter (PM100D, Thorlabs Inc.) equipped with a thermal sensor (S305C, Thorlabs Inc.) The evaporation weight change was measured by an electronic scale every 10 minutes.

In a dark environment (i.e., at room temperature of 21° C. and humidity of 10%), the water weight loss was 0.44 g/h. Therefore, the average evaporation rate in the dark environment was 0.125 kg/(m$^2$·h), which was subtracted from all subsequent measured evaporation rates to eliminate the effect of natural water evaporation. Under solar illumination using a solar simulator (Newport 69920 with the solar intensity of 1 kW/m$^2$, i.e., AM1.5), the weight loss increased to 1.11 g/h. After that, a 4×4 cm$^2$ white paper and a 4×4 cm$^2$ CCP were placed on top of the water surface, and the weight change increased to 1.16 g/h and 1.48 g/h, respectively. To interpret the weight change difference, a portable thermal imager (FLIR ONE®) was used to characterize the temperature of these samples. The thermal imaging characterization was confirmed by a direct measurement using a thermocouple sensor probe, indicating a reasonable accuracy (i.e., ≤0.4° C. in the 33-35° C. range).

Figure 21:
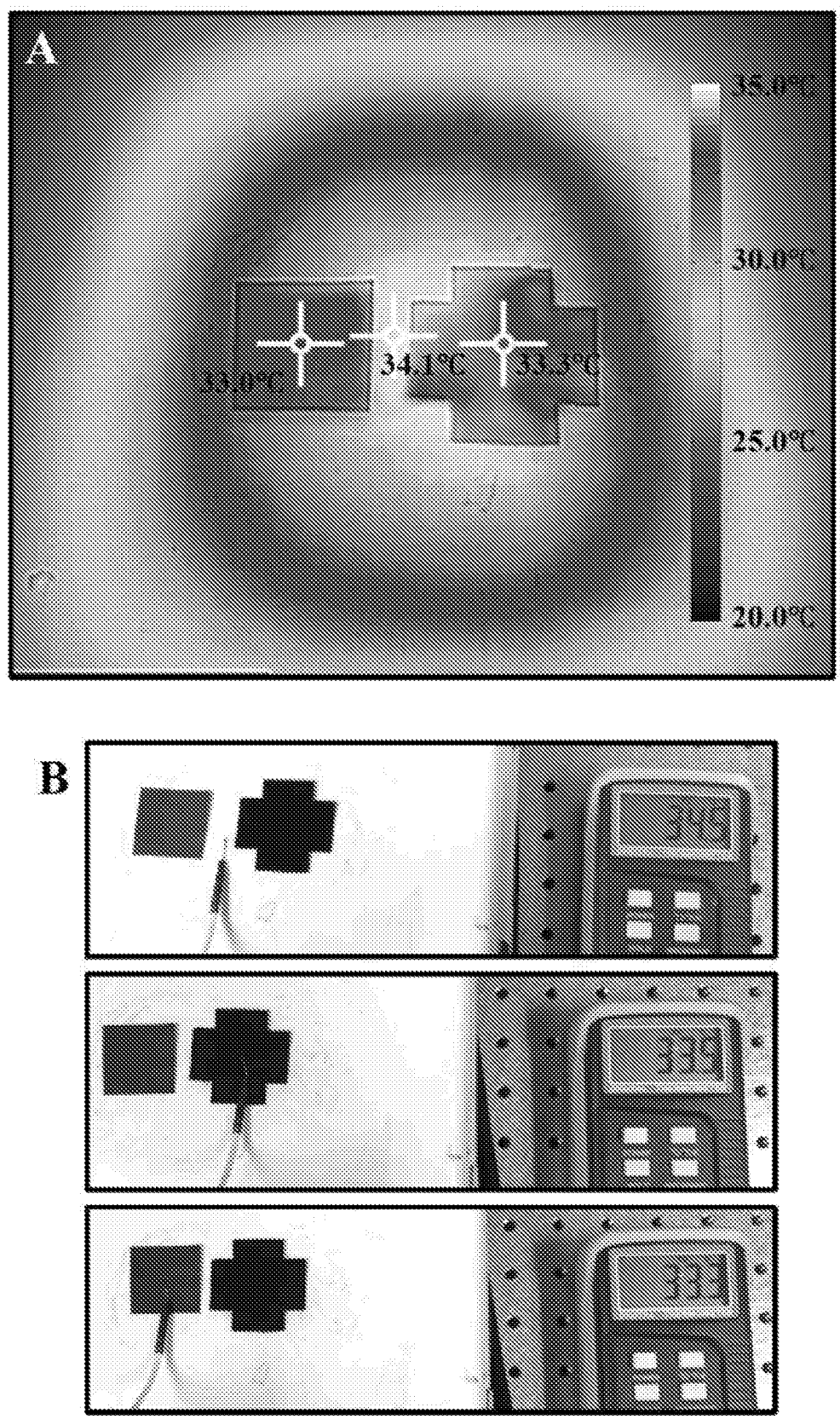
FIG. 21 (A) Surface temperature distribution of a black Al foil (left) and a CCP sample (right) placed on top of a heat plate set at 40° C. (B) Direct measurement of the temperature at three positions using a thermal couple sensor probe.

To demonstrate the accuracy of the thermal imaging used in the experiment, two samples (i.e., black Al foil and CCP sample) were placed on a heat plate (Super-Nuova™, HP131725). FIG. 21A shows the thermal image when the temperature of the heat plate was set to 40° C. The temperature was then measured at three different positions using a thermal couple sensor probe (Signstek 6802 II, see FIG. 21B), demonstrating the reasonable accuracy of the thermal imaging (i.e., ≤0.4° C.). Therefore, the temperature change over 5-10° C. observed in the subsequent characterization is reliable based on the thermal imaging data. It is noted that accurate measurement of the surface temperature is a technical challenge since it is dependent on many factors, especially the emissivity of the object being observed and the distance to the object. Therefore, thermal imager estimation of the temperature in the literature is usually not accurate.

To interpret the evaporation rate difference, the IR thermal imager (FLIR ONE, FLIR system) was used to measure the surface temperature of different samples. The vapor and liquid temperatures were also measured by a thermometer equipped with two K-Type thermocouple sensor probes (Signstek 6802 II). One of the probes was placed above the CCP sample and covered by a small piece of white cardboard to eliminate the heating effect of direct illumination (FIG. 22A). The other one was placed under the CCP sample to measure the temperature of bulk water (FIG. 22B).

As shown in FIG. 14E, the CCP surface temperature increased to the highest degree of 35.4° C. due to the enhanced solar-to-heat conversion.

However, this heating effect was not well isolated from the bulk water (i.e., the bulk water was heated to 31.7° C.), resulting in less efficient vapor generation effect. One can see that the water evaporation speed with the CCP was 1.33 times higher than that of pure water under the 1 kW/m$^2$ solar illumination.

Efficient Vapor Generation using Thermally Isolated CCP

Figure 15A:
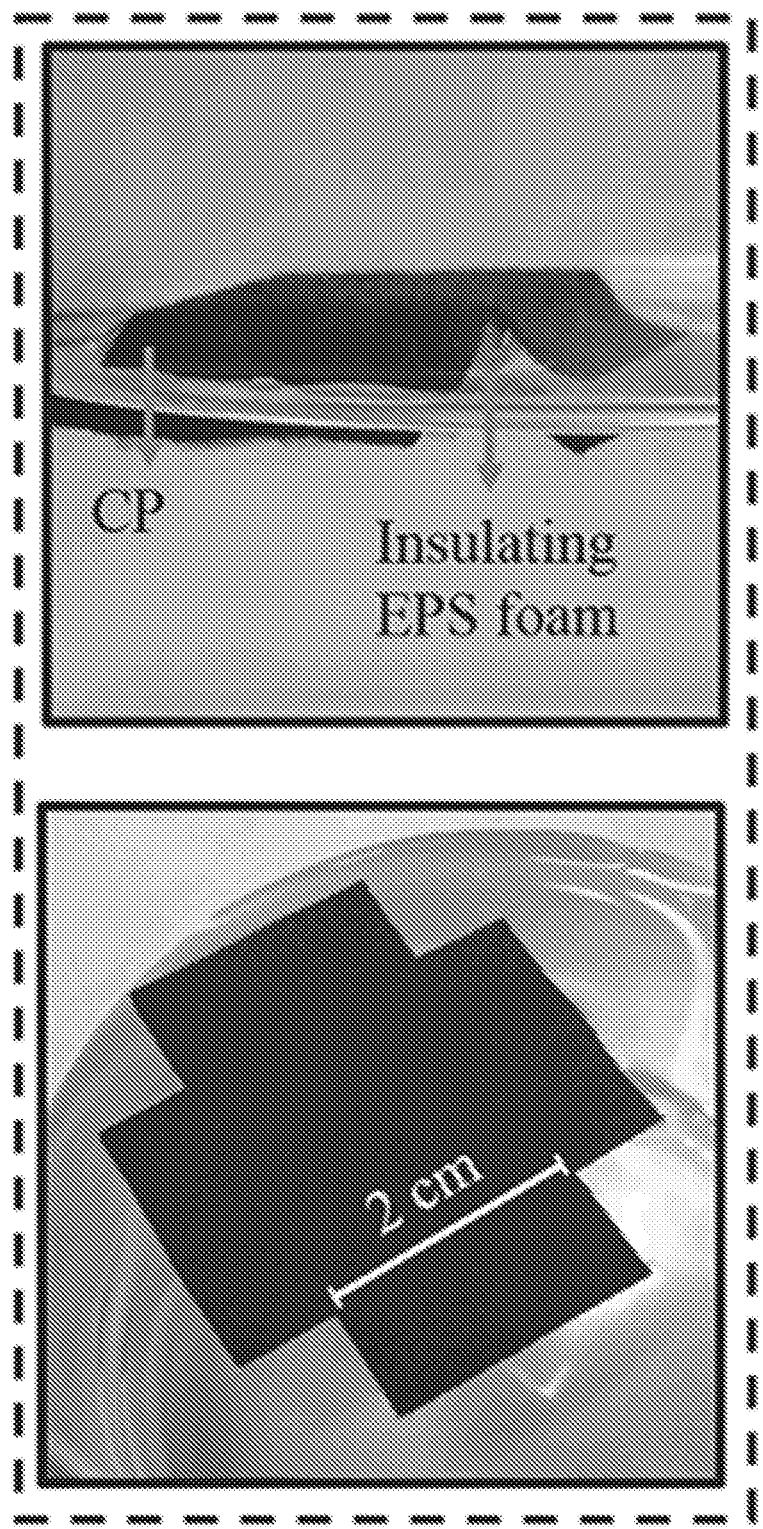
FIG. 15A Photographs of a CCP with (upper panel) and without the insulating EPS foam (lower panel) floating on top of water.

A thermal-isolating strategy was employed to confine the heating effect at the top surface for more efficient vapor generation. The finite thickness, large contact area and fluid transport of previously studied porous substrates led to relatively poor thermal insulation performance (e.g., in two previous studies, the thermal conductivities were 0.49 W/(m·K) and 0.426 W/(m·K)). Without being bound by any theory, a strategy was utilized for the test embodiment to make full use of the capillary force of the porous paper to draw fluid up around the support rather than through it, thus minimizing the thermal loss to the bulk fluid below. As shown by the upper panel in FIG. 15A, a 6-mm-thick EPS foam slab was inserted under the CCP to thermally isolate the porous paper from the bulk water. The thermal conductivity of this EPS foam was 0.03~0.04 W/(m·K), one of the lowest thermal conductivities available among extremely low cost materials. In this configuration, the only contact area between the water and CCP was at the edges of the porous paper (i.e., a line contact). This significantly reduced the region of fluid transport compared to placing the substrate directly on the water surface (see the lower panel in FIG. 15A). In this case, the paper contacting the water along the sides of the EPS foam transported the water droplets to the upper surface to facilitate evaporation. It should be noted that during testing, the upper surface of the CCP was always wet, indicating that this reduction in transport area did not limit the evaporation rate of the system.

Figure 15B:
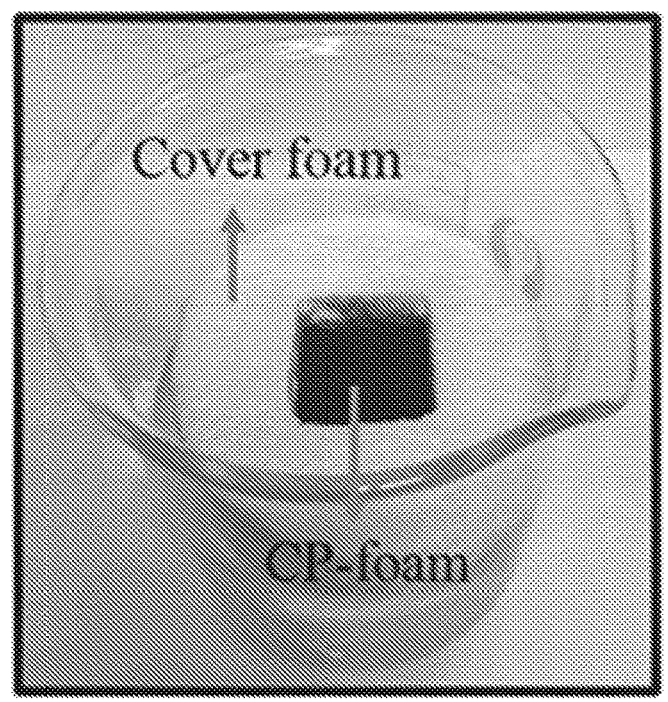
FIG. 15B Photograph of the CCP-foam structure with cover foam to eliminate evaporation from the water surface surrounding the CCP-foam structure.
Figure 15C:
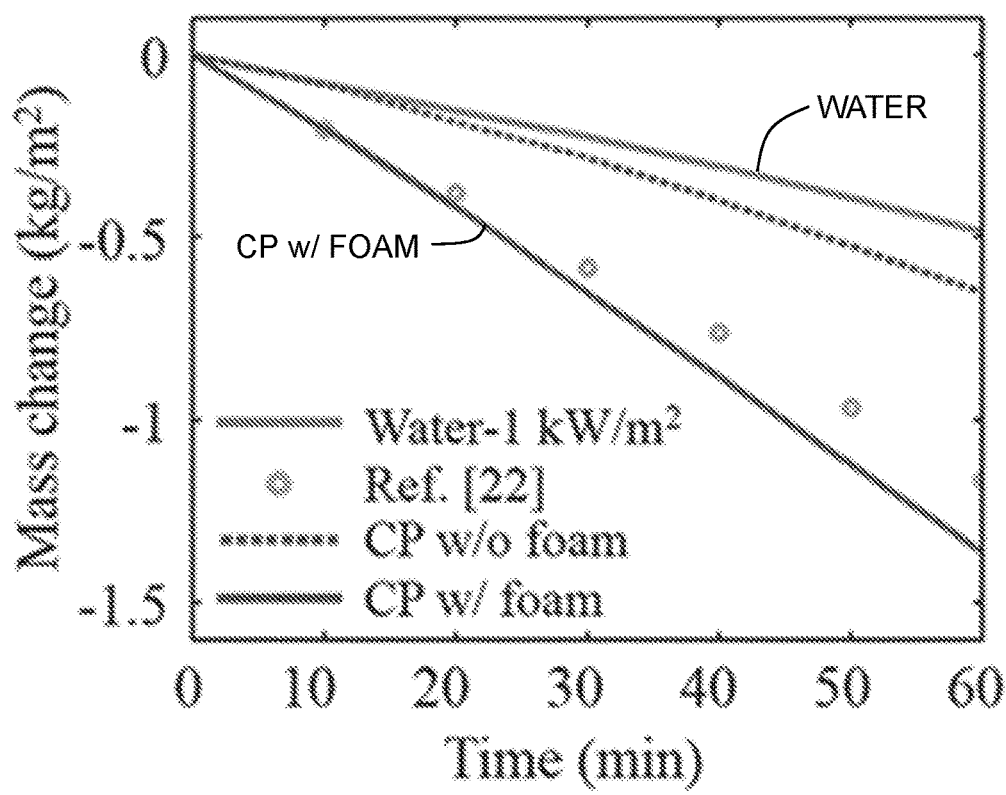
FIG. 15C Comparison of water mass change due to evaporation versus time under four different conditions: water under 1 kW/m$^2$, exfoliated graphite on foam from previous work, CCP without insulating foam, and CCP with insulating foam.
Figure 15D:
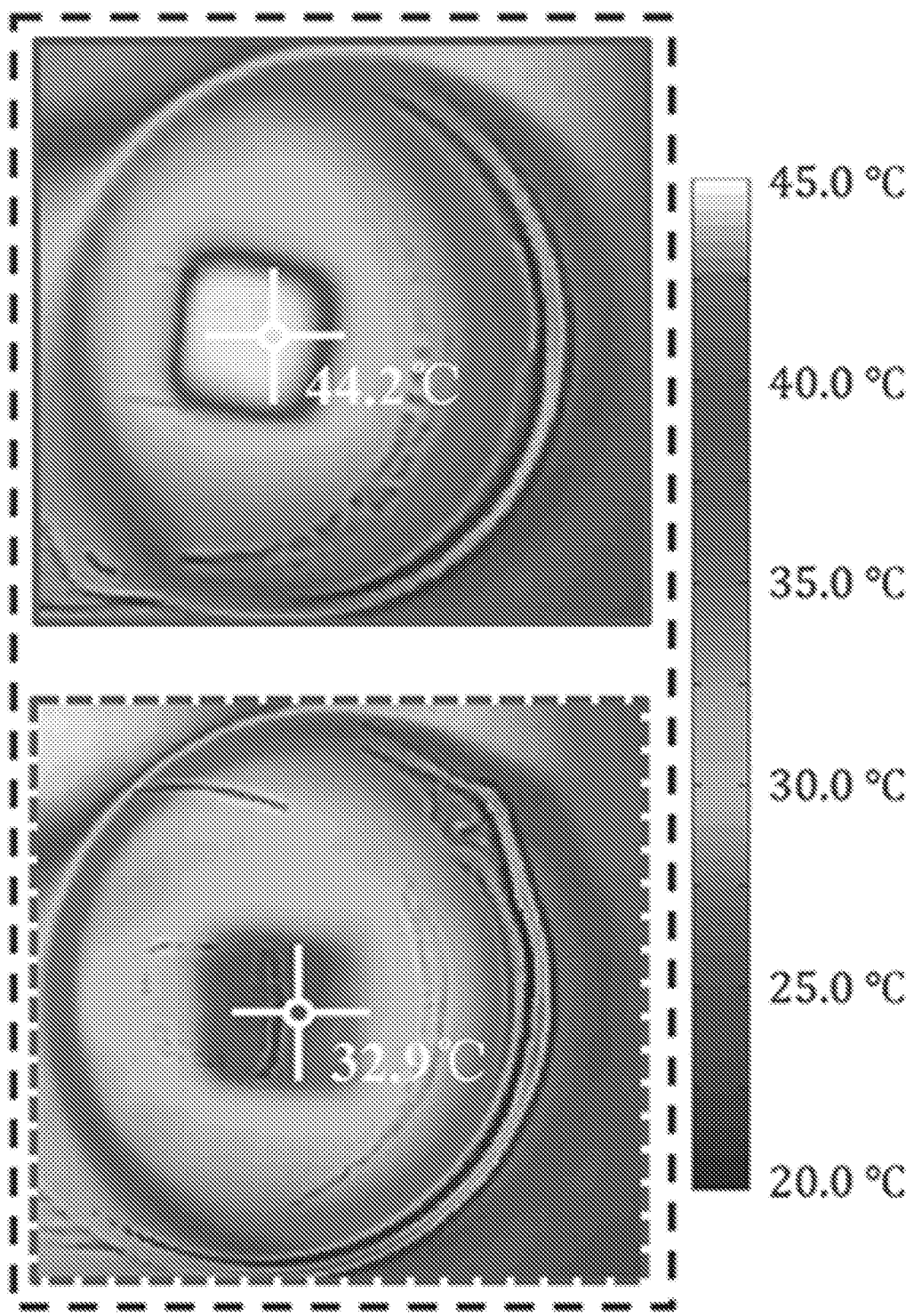
FIG. 15D Surface temperature distribution of an exemplary CCP with (upper panel) and without the insulating EPS foam (lower panel) floating on the water.

To eliminate water evaporation from other open areas, the surrounding exposed water surface was covered with EPS foam with a square hole for the CCP (FIG. 15B). To demonstrate the thermal isolation effect, the surface temperature was characterized with and without the EPS foam under the CCP, as shown in FIG. 2C. Under solar light illumination having an intensity of 1 kW/m², the upper surface temperature of the CCP increased from 32.9° C. (lower panel) to 44.2° C. with the EPS foam insulation (upper panel). The vapor generation performance is shown in FIG. 15C. One can see that the water mass change improved to 1.28 kg/(m²·h), which was 3.0 times greater than that of the pure water case and 2.0 times greater than that of CCP without EPS foam isolation. This evaporation rate was better than the best reported data under 1 sun illumination with no solar concentration using exfoliated graphite (i.e., circles of FIG. 15C). In principle, one would only need a ~0.2 m² structure to produce 2 liters of fresh water to meet an individual's daily needs assuming 8-hours of non-concentrated solar illumination. Solar concentration enhances this generation rate further.

Characterization of the Liquid Transportation Rate of the CCP

A potential concern for reduced liquid flow cross section would decrease the liquid flow rate to the CCP surface. To characterize this practical upper limit, the liquid transportation capability of the CCP was characterized. The original weight of a CCP sample was measured, and then an edge of the sample was placed into water and the IR imager was used to monitor water flow as the function of time. The 4-cm-long sample was saturated by water in ~25 seconds after which the weight of the wet-CCP was measured. It was noted that the flow rate was not a constant when the paper was saturated. By considering the small cross-sectional area of the CCP-layer (i.e., ~0.2 mm×2 cm), the practical upper limit of the CCP sample was well over 1,500 kg/m²/h, which is higher than the theoretical upper limit under 1,000× solar concentration. Therefore, the reduced liquid flow rate was not a limitation in the test system under small to moderate solar concentration.

High Solar Thermal Conversion Efficiency

In most previously reported work, the sample surface was always wet, indicating that the performance was limited by surface temperature only. Therefore, the ultimate performance can be improved by introducing concentrated solar illumination. Thus, the vapor generation performance was analyzed under moderate solar concentration conditions to better compare with previously reported nanostructures. In this experiment, an inexpensive planar PVC Fresnel lens (e.g., OpticLens®, $2.39/piece with the area of 26 cm×17.8 cm) was employed to focus the incident light from the solar simulator. As shown in FIG. 16A, when the solar light was concentrated by 3, 5, 7 and 10 times, the water mass change was increased to 3.66, 6.24, 9.34, and 13.30 kg/(m²·h), respectively. To characterize the enhanced surface heating effect more accurately, two thermocouple sensor probes were used to measure the temperature of vapor and bulk water (see FIG. 22). As shown by solid curves in FIG. 16B, the vapor temperature increased sharply within the first 3 minutes and reached a steady state after 10 minutes. In contrast, the temperature of bulk water increased slowly and continuously as shown by dashed lines in FIG. 16B. Higher concentration of light led to higher vapor and bulk water temperatures. Using Equation (2) below, a solar conversion thermal efficiency, $\eta_{th}$, of 88.6% was obtained under 1 sun illumination, and 94.8% under 10 times solar concentration, as shown in FIG. 16C. Compared with previous reports, this CCP-foam structure realized a very high solar thermal conversion efficiency, especially under low optical concentration condition. However, the test system shows that there is no need to employ large area solar concentrating systems, in contrast to other, more expensive systems.

To evaluate the solar-vapor generation performance quantitatively, the solar conversion thermal efficiency, $\eta_{th}$, was calculated, using Equation (2):

$$\eta_{th} = \frac{\dot{m} h_{LV}}{C_{opt} q_i} \quad (2)$$

where $\dot{m}$ is the mass flux, $h_{LV}$ is the total enthalpy of liquid-vapor phase change, $C_{opt}$ is the optical concentration, and $q_i$ is the normal direct solar irradiation (i.e., 1 kW/m²). Particularly, the calculation of the total enthalpy of liquid-vapor phase change, $h_{LV}$, should consider both the sensible heat and the temperature-dependent enthalpy of vaporization.

The thermal conversion efficiency, $\eta_{th}$, is widely employed in the literature as an important figure of merit in evaluating the performance of solar vapor generation. However, the detailed values for parameters employed in those literature are slightly different. Therefore, it is necessary to explain the calculation in detail to demonstrate that the presently-obtained $\eta_{th}$ was unambiguously higher than previously reported results.

The most frequently used equation for thermal conversion efficiency is $$\eta_{th} = \frac{\dot{m} h_{LV}}{C_{opt} q_i}. \quad \text{(Eq. (2))}$$

The variable parameter employed in different calculation was the total enthalpy of liquid-vapor phase change, $h_{LV}$, containing two parts: i.e., the sensible heat and the enthalpy of vaporization (i.e., $h_{LV} = C \times (T - T_0) + \Delta h_{vap}$). In the present experiments, $T_0$ was the initial temperature of water, i.e., 21° C. T was the vapor temperature measured by the thermometer, which was in the range of 40° C. to 90° C. (see data listed in Table 3 below). In this temperature range, the specific heat capacity of water, C, was a constant, i.e., 4.18 J/g·K. However, the enthalpy of vaporization, $\Delta h_{cap}$, was highly dependent on the temperature, which was larger at lower temperature. Recent literature employed different values of $h_{LV}$ in their calculation, resulting in certain inaccuracies in the resulting calculated $\eta_{th}$.

For instance, a first paper directly employed a constant $\Delta h_{vap}$ at 100° C. (2260 kJ/kg) as $h_{LV}$ to calculate $\eta_{th}$. Another paper employed a temperature-dependent enthalpy of vaporization $\Delta h_{vap}$ as $h_{LV}$ to calculate $\eta_{th}$. These sources did not consider the sensible heat (i.e., $C \times (T - T_0)$). In contrast, another paper considered the sensible heat but employed a constant $\Delta h_{vap}$ at 100° C. (2260 kJ/kg). By considering these two terms more accurately, the solar thermal conversion efficiencies of the presently-disclosed structure under 1, 3, 5, 7, 10 times concentrated solar illumination were calculated in Table 3. Fortunately, the sensible heat (i.e., $C \times (T - T_0)$) was much smaller than $\Delta h_{vap}$, especially under small solar concentration conditions, as shown by the data listed in Table 3. Therefore, previously reported values under 1 sun illumination are still reliable but may contain up to >10% difference under 10× solar concentration.

Thus, for energy conversion efficiency estimation, the sensible heat should be considered since this energy is actually consumed by the vapor. But if one focuses on vapor generation performance, this term can be neglected since it just results in higher temperature vapor rather than generates more vapor.

TABLE 3

Accurate calculation of the solar thermal conversion efficiency.

| Copt | m (kg/m² · h) | Vapor temperature T (° C.) | C × (T − T₀) (kJ/kg) | $\Delta h_{vap}$ (kJ/kg) | $\eta_{th}$ (%) |
|---|---|---|---|---|---|
| 1 | 1.28 | 41.6 | 86.1 | 2403.3 | 88.6 |
| 3 | 3.66 | 60.4 | 164.7 | 2357.6 | 85.5 |
| 5 | 6.24 | 69.9 | 204.4 | 2333.1 | 88.0 |
| 7 | 9.34 | 76.0 | 229.9 | 2320.7 | 94.5 |
| 10 | 13.30 | 88.9 | 283.8 | 2282.7 | 94.8 |

In addition, this $\eta_{th}$ actually describes the energy consumption in the vapor and has two major components: the energy used for water-to-vapor phase change and the energy used to heat the water/vapor. A larger $\eta_{th}$ does not necessarily correspond to a higher vapor generation rate. For a given value of $\eta_{th}$, a higher temperature of the generated vapor will actually result in a lower generation rate since more energy is used to heat the water. Therefore, in terms of solar vapor generation rate, it was beneficial to analyze the theoretical upper limit and thermal loss channels in order to estimate the opportunity available for improvement.

Loss Channels

Recently, a strategy was reported to demonstrate the close to 100° C. steam generation under one sun enabled by a floating structure with "thermal concentration." A detailed thermal loss analysis was performed, revealing that radiative loss and convective loss were two major thermal loss channels in the solar vapor generation systems. The radiative and the convective losses per area are expressed by Equations (3) and (4), respectively:

$$P_{rad} = \varepsilon \sigma (T_2^4 - T_1^4) \quad (3)$$

$$P_{con} = h(T_2 - T_1) \quad (4)$$

where ε is the emissivity of the CCP (i.e., 0.98), σ is the Stefan-Boltzmann constant (i.e., 5.67×10⁻⁸ W/(m²·K⁴)), $T_2$ is the temperature at the surface of the CCP, $T_1$ is the temperature of the adjacent environment, and h is the convection heat transfer coefficient (assumed to be 10 W/(m²·K)). Using these two equations, it was estimated that the radiative loss from the 100° C. blackbody absorber surface to the ambient environment (20° C.) was ~680 W/m² and the convective loss was ~800 W/m². Following this theoretical estimation, when the absorber surface was 44.2° C. (via experimental observation), the radiative loss to ambient was ~147 W/m² and the convective loss was ~232 W/m², corresponding to a total of 37.9% energy loss (i.e., 14.7%+23.2%). In this case, it seems that an efficiency ~90% is impossible. An immediate question is why one can observe a record high vapor generation rate under 1 sun.

Figure 17:
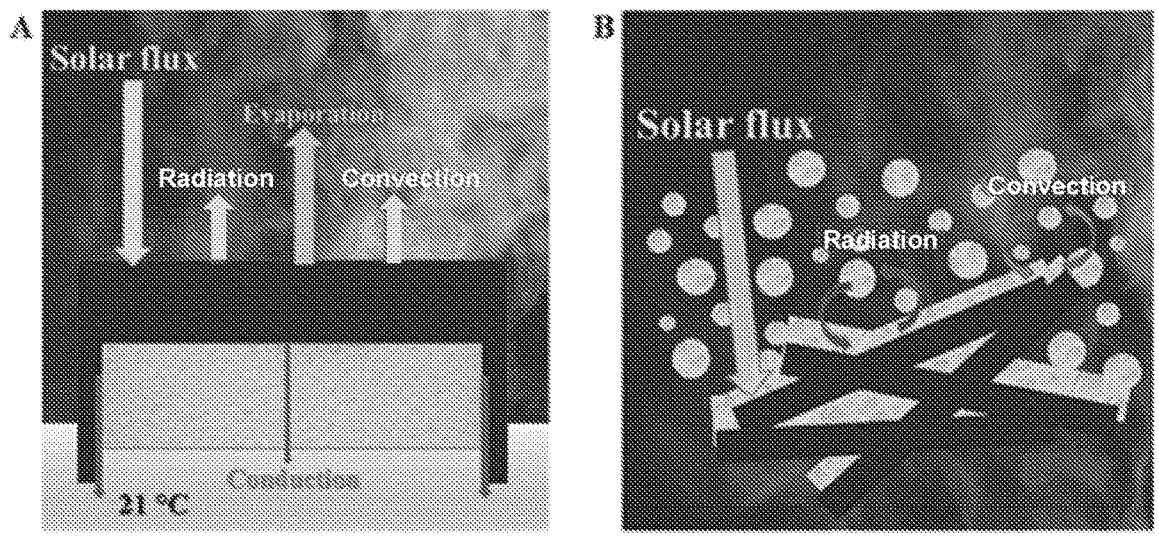
FIG. 17(A) Energy balance and heat transfer diagram in an exemplary CCP-foam architecture during the vapor generation process. (B) Diagram of the detail near the surface of the CCP structure during the vapor generation process.

To interpret the unique features and physics of the proposed CCP-foam architecture, the thermal environment and heat transfer diagram was analyzed (FIG. 17A). First, the downwards thermal radiation was suppressed. According to the previously reported experimental characterization, the reflection of a 3-mm-thick EPS foam slice was in the range of 40%-60% over the spectral region of thermal emission with ~10% thermal radiation absorption. Therefore, under thermal equilibrium condition, the temperature of the EPS-foam surface was very close to the bottom surface of the CCP layer so that the downwards radiative loss from the CCP layer was significantly suppressed. Without being bound by any theory, it appeared that the EPS foam employed in some embodiments of the present system served as a thermal radiation shield (in addition to its excellent thermal insulation characteristics), which was superior over previously reported double-sided black systems.

In further analysis of the microscopic thermal environment (FIG. 17B), one can recognize that the CCP surface was covered by a sheet of water and surrounded by heated vapor. Without being bound by any theory, it is believed that the absorbed solar energy of the CCP layer first exchanges thermal energy with water sheet and vapor in this small region rather than directly emitting thermal radiation and exchanging heat with the surroundings through the convection. In many reported experiments to identify the vapor temperature, a thermocouple was usually placed on top of the absorber surface, further demonstrating that the top surface of the absorber was surrounded by heated vapor. Since the temperature of the adjacent environment on top of CCP absorber was very close to the temperature of CCP surface, the radiative and convective loss should be very small. For instance, according to Eqs. (3) and (4), the radiative loss from the 44.2° C. surface under 1 sun to the ~41.6° C. vapor environment was ~1.8% and the convective loss was only ~2.6%. Most absorbed solar energy was still used to evaporate the water sheet on top of the absorber surface rather than lost through these two channels. Without being bound by any theory, it is believed that this is a major physical mechanism for the observed high vapor generation rate. This physical mechanism was not detailed in previous reports.

More importantly, in a real enclosed solar steam system, the vapor cannot be released immediately and the environment inside the system is thermally isolated from the cooler surrounding environment. Furthermore, typical acrylic or glass slabs are opaque to mid-infrared radiation. Consequently, thermal radiation cannot be emitted to the environment. Additionally, convective energy transfers are also largely suppressed when the internal environment is heated under near-thermal equilibrium conditions. In this case, the radiative and convective losses in a real system should be even more negligible. Intriguingly, in a recent report, the highest temperature of the generated steam was observed in a vapor chamber, demonstrating the accuracy of our physical picture.

Performance for Solar Desalination and the Effect of the Bulk Water Temperature

Conventional desalination technologies are usually energy demanding (e.g., reverse osmosis membrane technology consumes ~2 kW·h/m³) with serious environment costs. It was estimated that a minimum energy consumption for active seawater desalination is ~1 kW·h/m³, excluding prefiltering and intake/outfall pumping. Passive solar desalination technologies, such as that of the present disclosure, are particularly attractive due to the electricity-free operation with minimum negative impacts on the environment.

Figure 18:
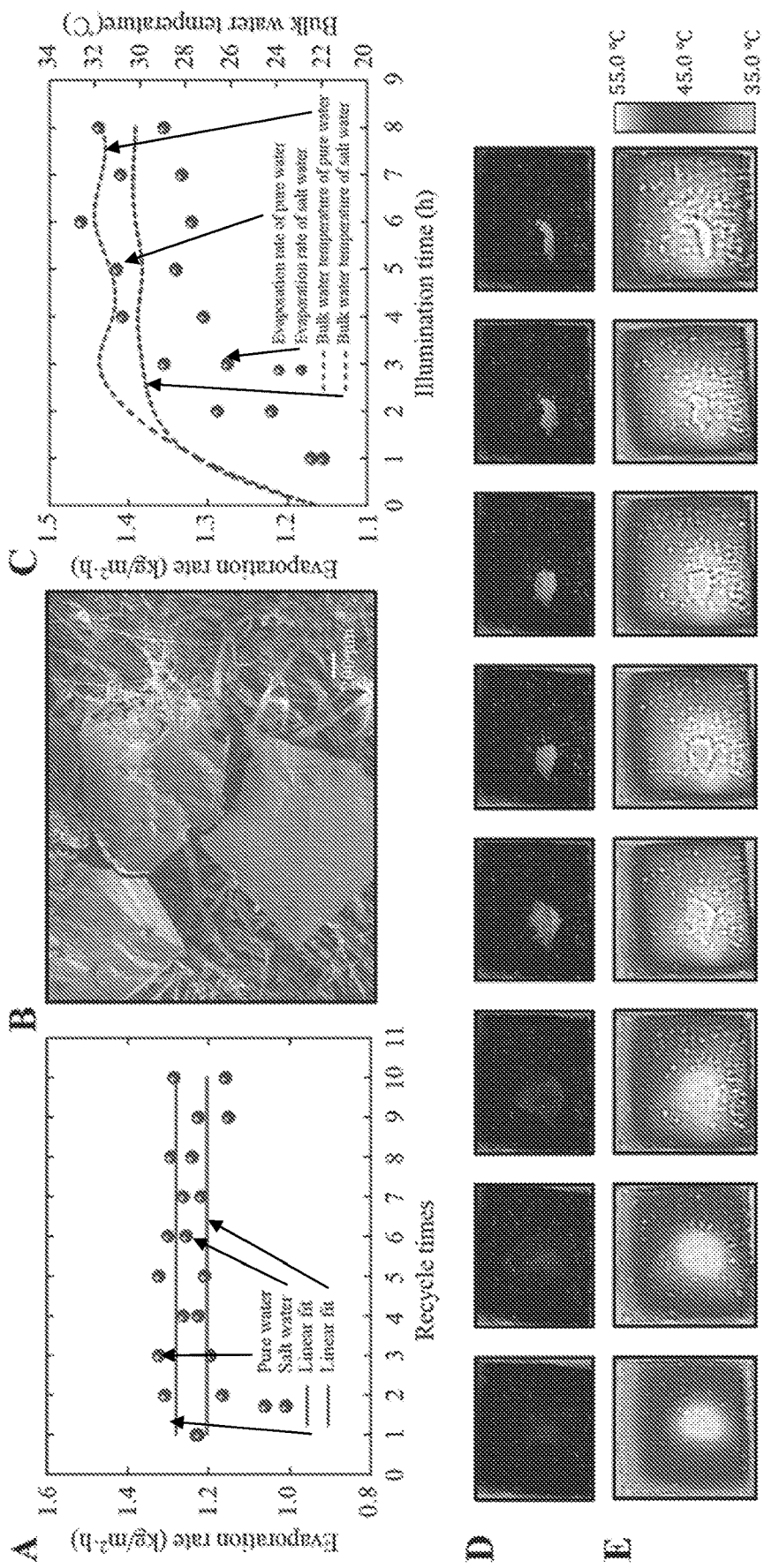
FIG. 18(A) Evaporation rate of exemplary CCP-foam samples on salt water and pure water as the function of cycle number. The two solid lines are reference lines to show the stable performance. (B) An SEM image of an exemplary CCP sample after 1 hour evaporation in salt water. (C) Evaporation rate of CCP sample in salt water over an 8-hour evaporation period as a function of illumination time. (D) Photographs and (E) thermal images of an exemplary CCP-foam on salt water at times corresponding to the evaporation rate of salt water in FIG. 17(C).

To characterize the evaporation performance and reusability of our CCP-foam for desalination, salt water was prepared with 3.5 wt % NaCl and the solar water evaporation experiment was performed repeatedly. For each cycle, two CCP-foam samples were put on the surfaces of salt water and pure water, respectively, and illuminated under 1 kW/m² for one hour. After that, the CCP samples were dried completely and reused for the next cycle. As shown in FIG. 18A, the evaporation rates of 10 cycles in pure water and salt water (see the arrows) are both stable (i.e., 1.2~1.3 kg/

(m²·h)), demonstrating the reliability of the proposed CCP-foam. Considering the excellent wet and dry strength and autoclavable features of the fiber-rich nonwoven paper (e.g., TechniCloth™ Wiper TX609, available from Texwipe™), it is particularly useful for long term solar desalination application.

After the 1-hour recycling test, a millimeter sized salt crystal was observed on the sample surface (see the first panel in FIG. 18D). Without being bound by any theory, it appears that these white salt particles introduce scattering (see FIG. 18B for SEM image of salt crystal plates on the CCP surface), which should reduce the optical absorption of the CCP sample. An immediate question is whether this salt crystallization will significantly degrade the performance of the vapor generation in practice, which was not mentioned in previous reports.

To investigate this issue, an 8-hour continuous experiment was performed in pure water and salt water in a beaker, respectively. Intriguingly, one can see that the evaporation speeds increased continuously and saturated at the $4^{th}$~$5^{th}$ hour at ~1.32 kg/(m²·h) and ~1.42 kg/(m²·h) for salt water and pure water, respectively, as shown by the dots connected by the solid lines in FIG. 18C. Since the CCP surface was always wet during the 8-hour test (indicating sufficient water transportation contributed by capillary forces), the salt crystal did not grow further to cover the entire surface. Instead, the salt crystal area even shrank surprisingly, as shown by the photographs of the CCP surface at different time spots (see FIG. 18D). When this experiment was repeated (usually on the next day), this evaporation rate increase was still observed under identical experimental conditions starting from the lower rate, indicating the stable and reusable performance for longer term seawater desalination. As shown by thermal images in FIG. 18E, the average surface temperature of the CCP sample increased from 44~45° C. gradually and saturated at 53~54° C. at the $4^{th}$~$5^{th}$ hour. Therefore, the next question is what introduced this surface temperature change.

Figure 14:
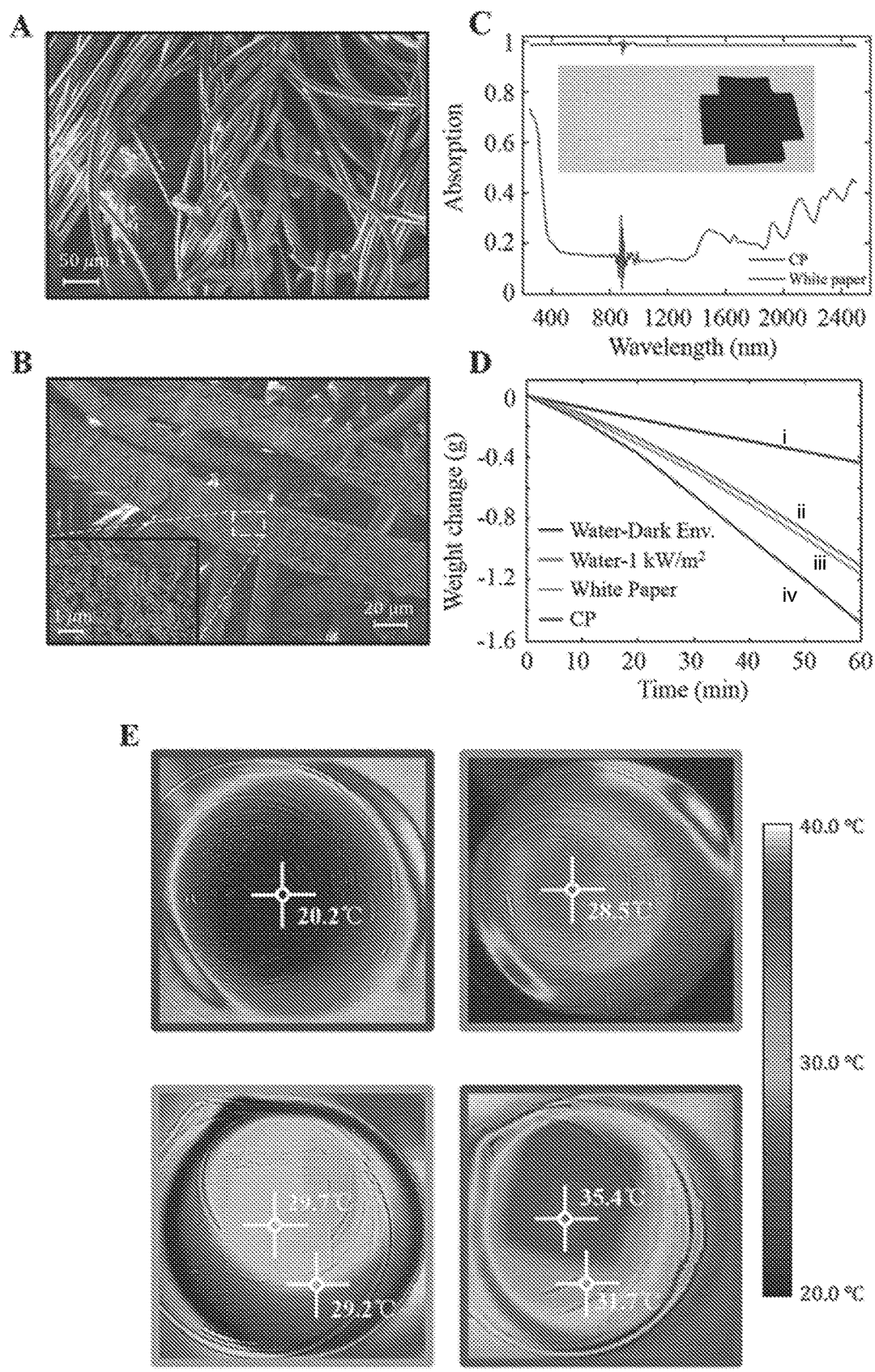
FIG. 14 (A) Scanning Electron Microscope (SEM) image of uncoated fiber-rich paper. (B) SEM image of CCP under low and high magnifications (inset). (C) Top line: Absorption spectra of uncoated white paper; Bottom line: Absorption spectra of CCP. Absorption spectra were measured by an integration sphere; Inset: Photograph of these two pieces of paper. (D) Comparison of water weight change versus time under four different conditions: i) water in dark environment; ii) water under 1 kW/m$^2$ illumination; iii) floating white paper under 1 kW/m$^2$ illumination and iv) floating CCP under 1 kW/m$^2$ illumination. (E) The surface temperature distribution of the four samples measured in FIG. 14(D) measured using a thermal imager: the upper left panel corresponds to i) of FIG. 14(D); the upper right panel corresponds to ii) of FIG. 14(D); the lower left panel corresponds to iii) of FIG. 14(D) and the lower right panel corresponds to iv) of FIG. 14(D).
Figure 16:
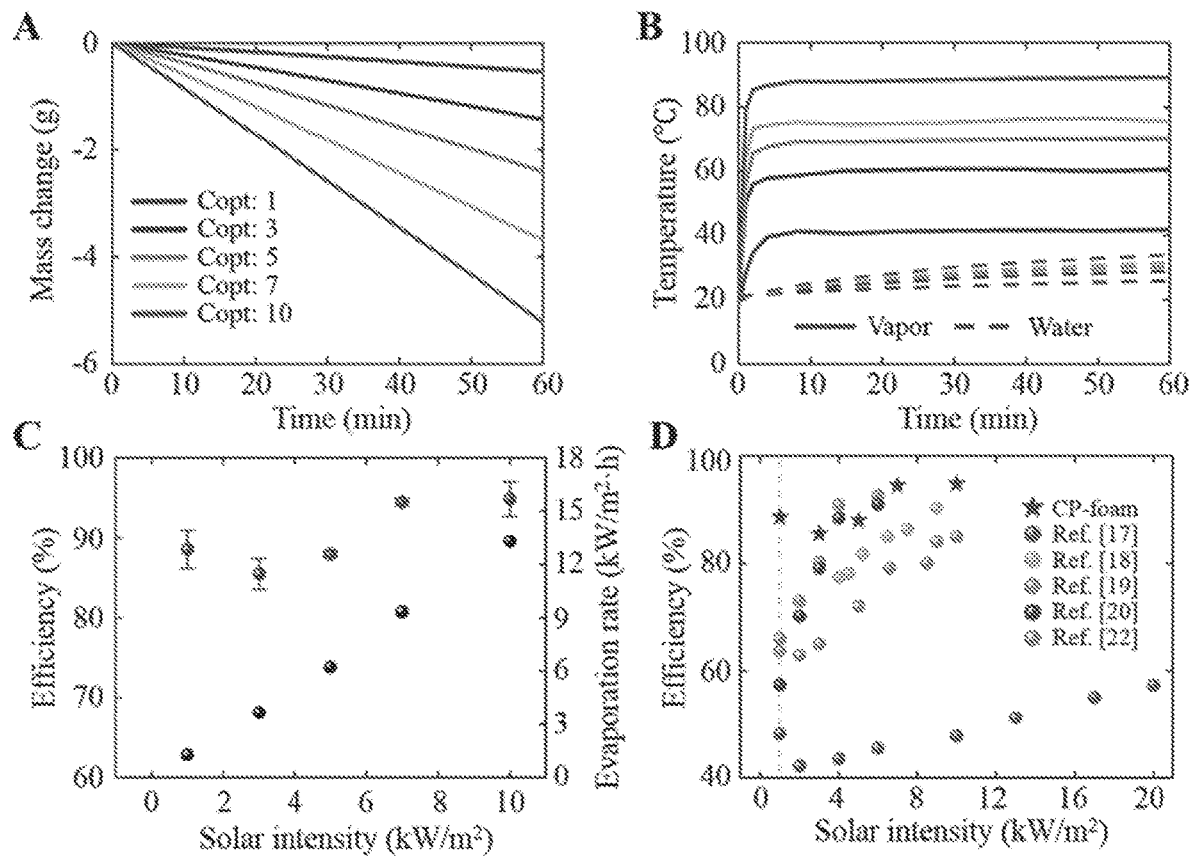
FIG. 16(A) The water mass change as a function of time under 1, 3, 5, 7 and 10 times concentrated solar illumination, respectively. (B) The temperature change as a function of time under 1, 3, 5, 7 and 10 times concentrated solar illumination, respectively. The solid lines represent vapor temperatures measured by a thermometer installed above the CCP-foam. The dashed lines represent bulk water temperatures measured under the foam, while the lines are as for FIG. 16(A). (C) The solar thermal conversion efficiency (light gray dots) and corresponding evaporation rate (black dots) as a function of solar intensity. (D) Direct comparison of solar thermal conversion efficiencies obtained by previously reported structures and an exemplary CCP-foam according to an embodiment of the present disclosure.

According to the experimental data shown in FIGS. 14-16, the only observed gradual change is the bulk water temperature, as shown by dashed curves in FIG. 16B. To identify this correlation, the bulk temperature was monitored over 8 hours, as shown by the dashed curves in FIG. 18C (see the arrows). One can see that the bulk water temperature (from 22° C. to 32~33° C.) and the evaporation rate changed coincidentally. This observation demonstrated that the surface temperature of the CCP-foam is still related to the bulk liquid temperature. The temperature of the bulk water in this experiment reached the thermal equilibrium after ~5 hours. This may be due to the excellent thermal insulation of the EPS foam support employed in the presently-disclosed structure. Also, it was observed that the salt crystal shrank as the bulk and surface temperature increased (i.e., FIG. 18D). This may be due to the higher solubility of salt in warmer water. This vapor generation performance should improve if better thermal insulation materials are used in the water container for small volume test. On the other hand, if the bulk water temperature change is negligible in larger scale vapor generation applications, one should not expect this obvious evaporation rate change, as is validated in the prototype system demonstration below.

A Prototype Solar Still System

An exemplary desalination solar still system is illustrated in FIG. 19A(A): A box made by thermal insulating materials is filled by seawater or salty water. A tilted transparent glass covers the box to collect solar light. For conventional solar vapor generation technology, light absorbing materials were usually placed at the bottom of the basin to heat the entire liquid volume with fairly low thermal efficiency (i.e., 30%-40%).

Figure 23:
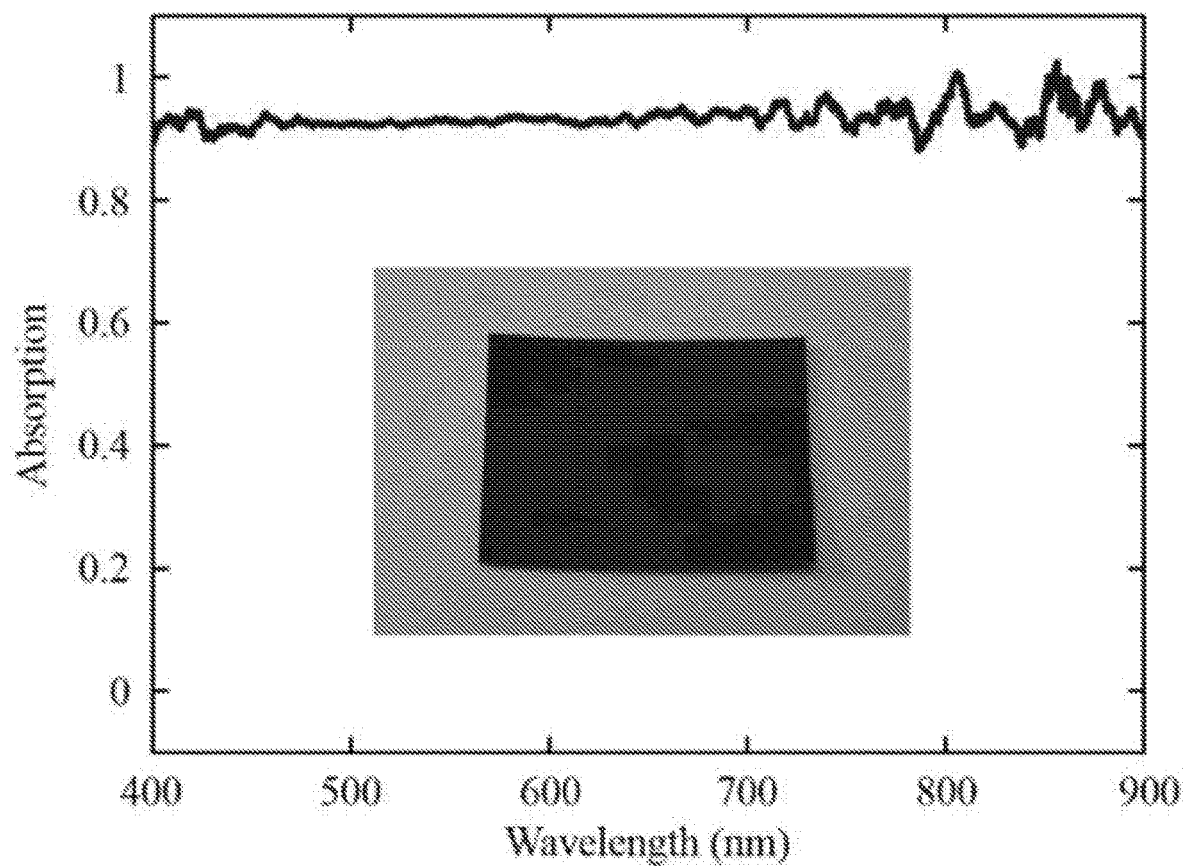
FIG. 23 Optical absorption spectrum of a black Al foil measured by an integration sphere. Inset: the photograph of a black Al foil.

To overcome this weakness, a 5×5 CCP array (FIG. 19A(B)) was developed wherein the array included a 2×2 cm² for each CCP unit with the total area of 100 cm². The array was placed in a polypropylene box (15 cm in diameter with 1500 g water). However, thermal isolating walls were not incorporated in this experiment. According to the thermal distribution measurement, the temperature of CCP surface increased from 18.2° C. (FIG. 19A(C) under dark condition) to 44.6° C. (FIG. 19A(D) under 1 sun illumination). Without being bound by any theory, it is believed that the slight nonuniformity of the temperature distribution (39.5° C. at the corner) in FIG. 19A(D) was introduced by the intensity distribution of the finite size of the light beam. To evaluate its performance, the solar desalination experiment was repeated using this large area sample (FIG. 19A(E)). Meanwhile, two control samples were characterized: (1) a layer of black aluminum foil placed at the bottom of the box (FIG. 19A(F), its optical absorption spectrum is shown in FIG. 23) and (2) salty water with no CCP-foam (FIG. 19A(G)). As shown in FIG. 19B(H), the mass change rate for the CCP-foam array was ~1.275 kg/(m²·h) (with the estimated thermal efficiency $\eta_{th}$ of 88.2%), which is obviously better than those for control samples (i.e., ~0.408 kg/(m²·h) with $\eta_{th}$ of 28.2% for the bulk heating strategy, and ~0.242 kg/(m²·h) with $\eta_{th}$ of 16.7% for the bare salt water evaporation). It was noted that the evaporation rate in this large scale CCP array experiment did not appear to increase. Its bulk water temperature change was also relatively small (20~25° C., as shown by the bottom dashed curve in FIG. 19B(H)). It is believed that this is due to the much larger amount of bulk water, without being bound by any theory. In contrast, the evaporation rates of the two control samples increased slightly, corresponding to their bulk temperature changes, as shown by their respective dashed curves in FIG. 19B(H) (see Description of the Drawings). The net water mass change produced by this 100 cm² CCP-foam structure was 14.5 g after the 5-hour operation, which was ~25 times of that produced by a single unit (i.e., 0.58 g/h, see FIG. 3). In this case, it was unnecessary to introduce a solar concentrator to enhance the water evaporation rate, which is different from the case for commercial concentrated photovoltaic systems. Due to the extremely low manufacturing cost of the CCP-foam, large area products can easily be realized using commercial paper printing technologies at a price much lower than those for conventional solar concentrators.

As shown in FIG. 19A(I), a complete portable solar still system was demonstrated using an open bottom box (with the 0.01 m² 5×5 CCP-foam array directly in contact with the open water below with buoyancy ensured by foam (represented by dark square visible along the exterior)), shown in the inset of FIG. 19A(I)). The clean water was collected by the distillate channel and guided into a collection bag. This system was then placed on a lake together with a commercial solar still product with an effective area of 0.342 m² (Aquamate Solar Still® (NATO stock no. 4610-99-553-9955) at the retail price of $225), as shown in FIG. 19A(J). It should be noted that the exemplary CCP-array can take the lake water directly while the Aquamate Solar Still® needs to be actively fed. It is believed that the Aquamate Solar Still® uses the conventional solar still principle of heating bulk water. The Aquamate Solar Still® does not use the presently-disclosed CCP-foam arrangement. It is likely that there are other differences between the systems, but the Aquamate Solar Still® is a closed system, so its contents cannot be readily ascertained. After a 10-hour operation in the outdoor environment on a sunny-cloudy day with varying sun light illumination conditions (see FIG. 19B(K) for temperature and sun light intensity distribution), generation productivities of 0.832 kg/(m²·day) and 0.344 kg/(m²·day) were obtained for these two systems, respectively. The performance of the CCP-foam system is ~2.4 times of the Aquamate Solar Still®. In addition, due to a scattering of mist formed on the cover (FIG. 19A(J)), the input light decreased significantly. Performance may be improved by the use of a non-toxic, super-hydrophobic surface treatment on the transparent glass cover of embodiments of the present disclosure. The prototype did not include corrugation or an air gap between the substrate and the support.

Cost Estimation and Comparison

Considering the key components for solar-to-heat conversion employed in previously-reported literature (e.g., metal nanoparticles or nanorods dispersed in water, metal nanoparticles on nanoporous anodic alumina, exfoliated graphite on porous carbon foam, a selective absorber inserted between a polystyrene foam disk and a bubble wrap), the cost of embodiments of the presently-disclosed structure is the low. In FIG. 19, a complete system was demonstrated using low cost plastic plates. It is well-known that the cost for plastic products are extremely low. However, the cost for condensate collection and other components are required by all solar still systems, which was not discussed in recent literature. According to a review article published in 2007, the net cost of materials for conventional solar still is ~$185.2/m². In contrast, the system shown in FIG. 19 is only $76.45/m² based on the small scale retail price for all materials/components (see Table 4 below). It is noted that the major cost was for the acrylic slabs, and that these slabs can be replaced by lower cost plastic boxes to reduce costs even further. The net cost for mass production will be significantly lower.

TABLE 4

Cost of a prototype solar still system (1 m²)

| | Unit price | Amount | Cost |
|---|---|---|---|
| Carbon black | $2.26/lb | 100 g | $ 0.50 |
| Fiber-rich paper | $1.05/m² | 1.5 m² | $ 1.58 |
| EPS foam | $0.59/m³ | 0.5 m³ | $ 0.30 |
| Acrylic slab | $31.20/m² | 2.31 m² | $72.07 |
| Collection bag | $2/each | 1 | $ 2.00 |
| | | Total | $76.45 |

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

We claim:

1. A solar vapor generation system, comprising:
   an open-topped vessel for holding a water-based solution;
   a substrate configured to wick solution from the open-topped vessel, wherein the substrate comprises two planar sheets connected to one another along an adjoining edge, and wherein the two planar sheets connect at an angle of between 10.0 and 90.0 degrees; and
   a support, configured to support the substrate.

2. The solar vapor generation system of claim 1, wherein a temperature of the substrate is maintained substantially at or below an ambient temperature.

3. The solar vapor generation system of claim 1, further comprising a temperature-controlled housing for maintaining an ambient temperature above the substrate temperature.

4. The solar vapor generation system of claim 1, further comprising a condenser.

5. The solar vapor generation system of claim 1, wherein the substrate is a planar sheet generally parallel to a top surface of the solution.

6. The solar vapor generation system of claim 1, wherein the two planar sheets connect at an angle of between 20.0 and 45.0 degrees.

7. The solar vapor generation system of claim 1, further comprising an air mover configured to cause air to move adjacent to the substrate.

8. The solar vapor generation system of claim 1, wherein the substrate comprises a porous material.

9. The solar vapor generation system of claim 1, wherein the substrate comprises a cellulose/polyester blend, comprising 35% to 75% cellulose, and 45% to 65% polyester.

10. The solar vapor generation system of claim 1, wherein the substrate is black.

11. The solar vapor generation system of claim 1, wherein the support is configured to provide an air gap between the support and a portion of the substrate.

12. The solar vapor generation system of claim 1, wherein the support is a thermal insulator.

13. An apparatus for improved salt separation in an evaporation pond, comprising:
    a substrate configured to wick solution from the evaporation pond, wherein the substrate comprises two planar sheets connected to one another along an adjoining edge, and wherein the two planar sheets connect at an angle of between 10.0 and 90.0 degrees;
    a support, configured to support the substrate; and
    wherein a temperature of the substrate is maintained substantially at or below an ambient temperature.

14. The apparatus of claim 13, wherein the substrate is a planar sheet generally parallel to a top surface of the solution.

15. The apparatus of claim 13, wherein the two planar sheets connect at an angle of between 20.0 and 45.0 degrees.

16. The apparatus of claim 13, further comprising an air mover configured to cause air to move adjacent to the substrate.

17. The apparatus of claim 13, wherein the substrate comprises a porous material.

18. The apparatus of claim 13, wherein the substrate comprises a cellulose/polyester blend, comprising 35% to 75% cellulose, and 45% to 65% polyester.

19. The apparatus of claim 13, wherein the substrate is black.

20. The apparatus of claim 13, wherein the support is configured to provide an air gap between the support and a portion of the substrate.

21. The apparatus of claim 13, wherein the substrate includes a hydrophilic treatment.

22. The apparatus of claim 21, wherein the substrate includes sodium alginate.

23. A method for solar evaporation, comprising:
    providing a substrate configured to wick solution, wherein the substrate comprises two planar sheets connected to one another along an adjoining edge, and wherein the two planar sheets connect at an angle of between 10.0 and 90.0 degrees;

exposing the substrate to solar energy; and
maintaining a temperature of the substrate substantially at or below a temperature of the atmosphere.

24. The method of claim 23, wherein the substrate is black.

* * * * *